United States Patent
Westlund et al.

(10) Patent No.: US 11,768,129 B2
(45) Date of Patent: Sep. 26, 2023

(54) MACHINE-LEARNING BASED VEHICLE DIAGNOSTICS AND MAINTENANCE

(71) Applicant: Volvo Car Corporation, Gothenburg (SE)

(72) Inventors: Robin Westlund, Gothenburg (SE); Sadegh Rahrovani, Gothenburg (SE); Prakhar Tyagi, Solna (SE); Nastaran Soltanipour, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 829 days.

(21) Appl. No.: 16/410,850

(22) Filed: May 13, 2019

(65) Prior Publication Data
US 2020/0363296 A1  Nov. 19, 2020

(51) Int. Cl.
*G01M 17/007* (2006.01)
*G06N 20/20* (2019.01)
*G07C 5/08* (2006.01)
*G07C 5/02* (2006.01)

(52) U.S. Cl.
CPC .......... *G01M 17/007* (2013.01); *G06N 20/20* (2019.01); *G07C 5/02* (2013.01); *G07C 5/0841* (2013.01)

(58) Field of Classification Search
CPC ....... G01M 17/007; G06N 20/20; G07C 5/02; G07C 5/0841
See application file for complete search history.

(56) References Cited

U.S. PATENT DOCUMENTS

| 6,823,244 | B2 | 11/2004 | Breed |
| 9,014,918 | B2 | 4/2015 | Hagen et al. |
| 9,558,601 | B2 | 1/2017 | Lu et al. |
| 10,346,725 | B2 | 7/2019 | Weller et al. |
| 2003/0009270 | A1* | 1/2003 | Breed ............... G06K 7/10178 701/32.4 |
| 2007/0131474 | A1* | 6/2007 | Zetterstroem .......... B62D 17/00 280/124.135 |
| 2010/0161169 | A1 | 6/2010 | Ramanathan et al. |
| 2013/0116996 | A1 | 5/2013 | Callan |

FOREIGN PATENT DOCUMENTS

| WO | WO-2018200541 A1 * | 11/2018 | ............... G01D 5/00 |
| WO | WO-2019006473 A1 * | 1/2019 | ............. G01S 15/58 |

* cited by examiner

*Primary Examiner* — Vivek D Koppikar
*Assistant Examiner* — Jeffrey R Chalhoub
(74) *Attorney, Agent, or Firm* — Shumaker & Sieffert, P.A.

(57) ABSTRACT

In general, techniques are described by which provide vehicle diagnostics and maintenance. A device comprising an interface and a processor may be configured to perform the techniques. The interface may be configured to communicate with a plurality of sensors to obtain a plurality of sensor signals representative of one or more states of a vehicle. The processor may be configured to apply a trained classifier with respect to the plurality of sensor signals to identify one or more components of the vehicle that result in a change of the vibration during operation of the vehicle.

14 Claims, 19 Drawing Sheets

MACHINE-LEARNING BASED VEHICLE DIAGNOSTICS AND MAINTENANCE

TECHNICAL FIELD

This disclosure relates to vehicles and, more specifically, diagnostics for vehicles.

BACKGROUND

Vehicles are increasingly featuring a wide array of sensors, each of which may be dedicated to detecting one or more states of the vehicle. Over time, the vehicle may deteriorate in various ways resulting in fluctuation of the states of the vehicle that may result in false positives or misdiagnosis of the condition causing the state changes. For example, vehicles may include a tire pressure monitoring system (TPMS) that may detect a low tire pressure state when the actual problem is a broken damper. The false positive may result in significant cost and expense in attempting to locate the actual problem (e.g., the broken damper), while creating occupant confusion as attempts to correct the false positive (e.g., the low tire pressure state) do not resolve the actual problem.

SUMMARY

In general, techniques are described for enabling a vehicle to perform sensor fusion with respect to a number of different sensors in an effort to avoid false positive state detection. Sensor fusion may refer to a process whereby the vehicle processes a number of different sensor signals using machine learning (and/or a model based classifier or data driven processes)/to distinguish between different components of the vehicle and the respective states of each component. By potentially reducing false positive state detection, the techniques may avoid occupant frustration and increased maintenance expense (as the diagnosis is more accurate resulting in less service time to locate the source of an issue), thereby improving the operation of the vehicle itself.

In one example, aspects of the techniques are directed to a device configured to perform diagnostics, the device comprising: means for obtaining, from a plurality of sensors, a plurality of sensor signals representative of one or more states of a vehicle; and means for applying a trained classifier to the plurality of sensor signals to identify one or more components of the vehicle that result in a change of vibrations during operation of the vehicle.

In another example, aspects of the techniques are directed to a method of performing diagnostics, the method comprising: obtaining, from a plurality of sensors, a plurality of sensor signals representative of one or more states of a vehicle; and applying a trained classifier to the plurality of sensor signals to identify one or more components of the vehicle that result in a change of vibrations during operation of the vehicle.

In another example, aspects of the techniques are directed to a device configured to perform diagnostics, the device comprising: an interface configured to communicate with a plurality of sensors to obtain a plurality of sensor signals representative of one or more states of a vehicle; and one or more processors configured to apply a trained classifier with respect to the plurality of sensor signals to identify one or more components of the vehicle that result in a change of the vibrations during operation of the vehicle.

In another example, aspects of the techniques are directed to a non-transitory computer-readable medium having stored thereon instructions that, when executed, cause one or more processors of a diagnostic device to: interface with a plurality of sensors to obtain a plurality of sensor signals representative of one or more states of a vehicle; and apply a trained classifier with respect to the plurality of sensor signals to identify one or more components that result in a change of vibrations during operation of the vehicle.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
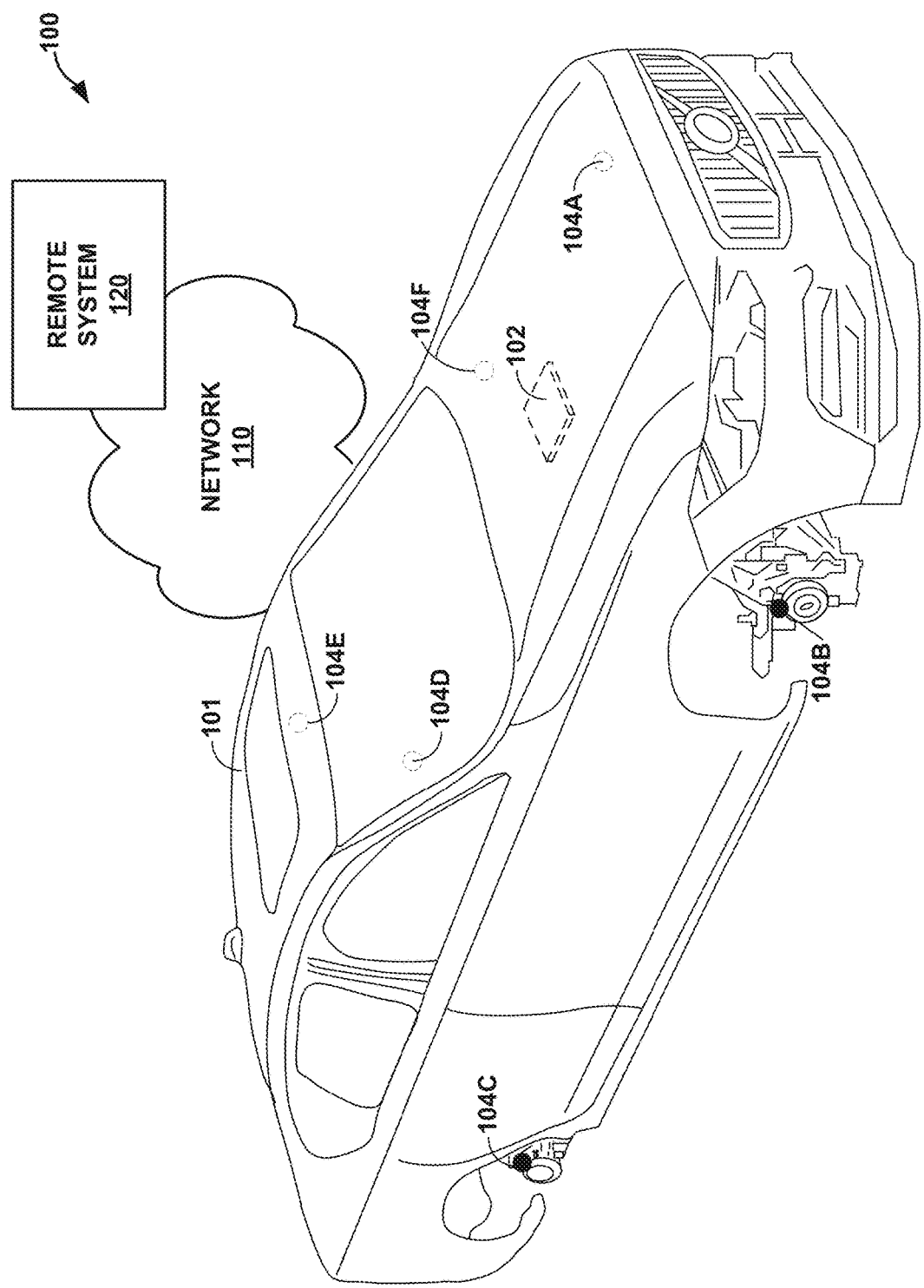
FIG. 1 is a diagram illustrating an example system configured to perform various aspects of the machine learning based vehicle diagnostic techniques described in this disclosure.

FIG. 1 is a diagram illustrating an example system configured to perform various aspects of the machine learning based vehicle diagnostic techniques described in this disclosure. As shown in the example of FIG. 1, system 100 includes a vehicle 101, a network 110, and a remote system 120.

Although shown as an automobile in the example of FIG. 1, vehicle 101 may represent any type of vehicle, including an automobile, a truck, farm equipment, a motorcycle, a bike (including electronic bikes), a scooter, construction equipment, a semi-truck, an airplane, a helicopter, a military vehicle, or any other type of vehicle capable of implementing various aspects of the machine learning based vehicle diagnostic techniques described in this disclosure.

Network 110 may represent any type of network by which communication between vehicle 120 and remote system 120 may be accomplished. Network 110 may represent a public network (e.g., the Internet), a private network, a cellular network (including various cellular data network, such as a 3G, 4G and/or 5G network), a personal area network, or combinations thereof.

Remote system 120 may represent one or more devices configured to communicate via network 110 with vehicle 101. Remote system 120 may communicate via network 110 with vehicle 101 to monitor or otherwise retrieve diagnostic data concerning one or more components of vehicle 101, such as an engine, an anti-lock breaking system (ABS), a traction control (TC) system, an electronic stability control (ESC) system, brake system, heads-up display system, coolant system, navigation system, infotainment system, or any other component or system integrated into vehicle 101 or in communication with vehicle 101. Remote system 120 may, in addition or as an alternative to monitoring vehicle 101, communicate with vehicle 101 to update one or more of the above noted components of vehicle 101. Remote system 120 may, for example, represent a system that supports the Volvo On Call™ service.

As further shown in the example of FIG. 1, vehicle 101 includes a computing system 102 and a plurality of sensors 104A-104F ("sensors 104"). Computing system 102 and some of sensors 104 are shown in the example of FIG. 1 using dashed lines to denote that computing device 102 and sensors 104 may not be visible or are otherwise integrated within vehicle 101.

Computing system 102 may include one or more electronic control unit (ECUs) and a computing device. For example, computing system 102 may include an ECU configured to control the ABS (which may also control TC), an ECU configured to control the ECS system, and a main ECU acting as the computing device to direct operation of all of the systems (including those not listed in this example). Generally, an ECU includes a microcontroller, and memory (such as one or more of static random access memory—SRAM, electrically erasable programmable read-only memory—EEPROM, and Flash memory), digital and/or analog inputs, digital and/or analog outputs (such as relay drivers, H bridge drivers, injector drivers, and logic outputs).

In some examples, rather than utilize an ECU as the computing device, computing system 102 may include a relatively more powerful processor (compared to the microcontroller) configured to execute instructions or other forms of software to perform various aspects of the machine learning based vehicle diagnostic techniques described in this disclosure. The processor may represent one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. When the techniques are implemented partially in software, computing system 102 may store instructions for the software in a suitable, non-transitory computer-readable medium and execute the instructions in hardware using one or more processors to perform the techniques of this disclosure. A device including computing system 102 may comprise an integrated circuit, and/or a microprocessor.

For purposes of illustration, computing system 102 is assumed to represent a processor communicatively coupled to one or more ECU responsible for controlling operation of the ABS and the ESC system. The ABS ECU may be communicatively coupled to sensors 104 configured to sense wheel speed at each of the wheels of vehicle 101. Sensors 104A-104D may represent examples of sensors 104 configured to sense wheel speed at the wheels of vehicle 101 (although the wheels are not shown so as to illustrate an approximate location of sensors 104B and 104C), and as such may be referred to as "wheel speed sensors 104."

Wheel speed sensors 104 may interact with a ferromagnetic toothed reluctor ring (which may also be referred to as a "tone wheel"). The tone wheel may be installed near each end of the axels, and wheel speed sensors 104 may be located proximate to the tone wheel. The tone wheel may include a number of teeth, and wheel speed sensors 104 may, via electromagnetic induction, identify the teeth (as induction increases with proximity). Wheel speed sensors 104 may each include a ferromagnetic rod that is oriented to project radially from the tome wheel with a permanent magnet at the opposite end. The rod of each of the wheel speed sensors 104 may be wound with fine wire which experiences an induced alternative voltage as the tone wheel rotates, as the teeth interfere with the magnetic field. Wheel speed sensors 104 may generate a sensor signal representative of the wheel speed in the form of a sinusoidal signal, which grows in magnitude and frequency with wheel speed.

In some instances, wheel speed sensors 104 do not include a magnet, but the tone wheel consists of alternative magnetic poles to produce the alternative voltage. Further, in these and other examples, wheel speed sensors 104 may include conditioning circuitry configured to perform one or more of amplifying the magnitude of the sensor signal, changing the form of the sensor signal to be pulse-wave modulated, a square wave, or other forms, and/or encode the value into a communication protocol (such as a controller area network—CAN) prior to transmission to the ABS ECU.

The ESC ECU may be communicatively coupled to the wheel speed sensors 104, a sensor 104E configured to sense lateral acceleration and/or yaw rate, and/or a sensor 104F configured to sense a steering angle (and as such may be referred to as a "steering angle sensor 104F" or "SAS 104F"). Sensor 104E may include one or more of an accelerometer and a gyroscopic device (or, in other words, gyroscope) and as such may be referred to as "accelerometer/gyroscope sensor 104E" or "A/E sensor 104E." SAS 104F may include an analog sensor that senses a voltage that varies between 0 and 5 volts (V) as the steering wheel is turned. Alternatively, SAS 104F may represent a digital SAS that includes a light emitting diode that emits light upon a wheel that acts as a shutter, where an optic sensor measures the interruption of light and converts those interruptions into a representation of the steering angle.

The processor may be communicatively coupled to the ECS ABS and the ESC ECU to obtain various sensor signals provided by sensors 104 to the ABS ECU and the ESC ECU. Although described as being separate ECUs, a single ECU may control both the ABS and ESC. For example, the processor may interface with the ABS ECU and the ESC ECU to obtain sensor signals representative of the wheel speed provided by wheel speed sensor 104, sensor signals representative of the lateral speed and/or yaw rate provided by A/G sensor 104D, sensor signals representative of the steering angle provided by SAS 104F, and any other type of sensor signal representative of one or more states of vehicle 101 (such as sensor signals representative of relative of one or more of wheel speed, pitch, lateral speed, roll, longitudinal acceleration, longitudinal speed, engine speed, engine torque, etc.).

The processor may analyze the one or more of the sensor signals to identify states of components of vehicle 101. For example, vehicle 101 may not include tire pressure monitoring sensors that would otherwise be installed within the tires of vehicle 101 (again not shown in the example of FIG. 1). Instead, vehicle 101 may enable the processor of computer system 102 to identify, based on the sensor signals from wheel speed sensors 104, that one or more of the tires of vehicle 101 have low pressure (or, in other words, are operating in a low tire pressure state).

Rather than resort to a direct tire pressure monitoring system (TPMS), which requires additional costs by way of purchasing and installing tire pressure sensors in the tires (which generally only last five years and then must be replaced), the processor may leverage existing sensor signals from wheel speed sensors 104 to indirectly identify the low tire pressure state. This indirect approach to TPMS may be referred to as indirect TPMS (iTPMS). In other words, the iTPMS does not utilize, nor does vehicle 101 (or sensors 104) include tire pressure sensors directly coupled to the wheels of vehicle 101 and therefore none of sensors 104 output sensor signals defining a tire pressure of the wheels of vehicle 101. Rather, iTPMS identifies the tire pressure based on sensor signals representative of wheel speed (or relative wheel speed, which may define the wheel speed for one wheel relative to one or more of the other wheels).

Although iTPMS and other indirect approaches to detecting one or more states (such as the above noted low tire pressure state) of vehicle 101 may provide cost savings and more advanced vehicle state detection, vehicle 101 may deteriorate in various ways that result in fluctuation of the states of the vehicle that may result in false positives or misdiagnosis of the condition causing the state changes. For example, the iTPMS may detect a low tire pressure state when the actual problem is a broken damper or some other component of the chassis. The false positive may result in significant cost and expense in attempting to locate the actual problem (e.g., the broken damper), while creating occupant confusion as attempts to correct the false positive (e.g., the low tire pressure state) do not resolve the actual problem.

In accordance with various aspects of the techniques described in this disclosure, vehicle 101 may perform sensor fusion with respect to a number of different sensors 104 in an effort to avoid false positive state detection. Sensor fusion may refer to a process whereby vehicle 101 processes a number of different sensor signals using machine learning to distinguish between different components of the vehicle and the respective states of each component. By potentially reducing false positive state detection, the techniques may avoid occupant frustration and increased maintenance expense (as the diagnosis is more accurate resulting in less service time to locate the source of an issue), thereby improving the operation of vehicle 101 itself.

In operation, computer system 102 may interface with a plurality of sensors 104 to obtain a plurality of sensor signals representative of one or more states of vehicle 101 in the manner described above in more detail. Computer system 102 may next apply a trained classifier with respect to the plurality of sensor signals to identify one or more components of vehicle 101 that result in a change in vibration.

In the example of FIG. 1, computer system 102 may apply the trained classifier with respect to the sensor signals described above to identify one or more chassis components of vehicle 101 that result in the change of vibrations. The components of the chassis of vehicle 101 may include one or more of a damper, a spring, a wheel, a wheel hub, a brake, a control arm, a bushing, a tie, a tie rod, a bolt joint, and a wheel bolt.

Although described with respect to the chassis of vehicle 101 and components thereof, various aspects of the techniques may be applied with respect to any other component system of vehicle 101, such as an engine, a fuel system, a lighting system, an electrical system, a cooling system, and the like. Further, although described with respect to identifying components of vehicle 101 that result in the change of vibrations, various aspects of the techniques may be applied with respect to components of vehicle 101 that result in any issue susceptible to misdiagnosis or false positives, such as lighting issues, cooling issues, engine issues (including vibration), electrical issues, and the like.

In any event, computer system 102 may apply one or more forms of trained classifiers, such as a neural network (NN) or variants thereof (e.g., a long short-term memory—LSTM—NN, a convolutional NN—CNN, a perceptron NN—PNN, a feed forward NN—FFNN, a radial basis network—RBN, a deep feed forward NN—DFFNN, a recurrent NN—RNN, a gated recurrent unit—GRU, an auto encoder NN—AENN, a variational AE NN—VAENN, a support vector machine—SVM, etc), Naïve Bayes, decision trees, logistic regressors, K-nearest neighbour analysis, deep learning, etc, to the sensor signals in order to identify the one or more components of the chassis of vehicle 101 that results in the change of vibrations during operation of vehicle 101.

In some examples, computer system 102 may apply an ensemble of forms of trained classifiers to identify the one or more components of the chassis of vehicle 101 that results in the change of vibrations during operation of vehicle 101. One such ensemble of trained classifiers may include a random forest classifier, which is a classifier that includes a Naïve Bayes model, a support vector machine, and a decision tree. The random forest classifier may apply each of the Naïve Bayes model, the support vector machine, and the decision tree to predict which of the components of the chassis are resulting in the change of vibrations during operation of vehicle 101, and use the predictions from each of the foregoing three as a vote to identify the component of the chassis that results in the change of vibrations during operation of vehicle 101.

In this manner, computing system 102 may apply the random forest classifier to the sensor signal output from sensors 104 to identify the one or more components of the chassis that result in the change of vibrations during operation of vehicle 101. Computing system 102 may store log data indicating the one or more components of the chassis that result in the change of vibrations during operation of vehicle 101, along with metadata, such as error codes, samples of the sensor data, or other data descriptive of one or more potential component states that may cause the one or more components of the chassis to produce the change in vibrations during operation of vehicle 101. Computing system 102 may also generate a notification or other status update, and present the status update to an occupant of vehicle 101, thereby alerting the occupant of the component state (which may also indicate that the occupant should schedule a service repair visit).

Further, computing system 102 may interface, via network 110, with remote system 120 to inform remote system 120 of the log data, the metadata, and the notification. Remote system 120 may, in some examples, maintain a fleet of vehicles that includes vehicle 101, whereupon such data may be aggregated with other fleet data to schedule service repairs. That is, remote system 120 may provide advanced backend service solutions by aggregating the data from the fleet.

Although described as computing system 102 applying the trained classifier to identify the one or more components of the chassis that may result in the change of vibrations during operation of vehicle 101, computing system 102 may, in addition or alternatively, interface with remote system 120 via network 110 to provide the sensor signals themselves. Remote system 120 may, in this example, apply the trained classifier to identify the one or more components of the chassis that result in the change of vibrations during operation of vehicle 101. Remote system 120 may also, in this example, generate the log data, the metadata, and the notification, interfacing with vehicle 101 via network 110 to communicate one or more of the log data, the metadata, and the notification to vehicle 101. Vehicle 101 may store the log data, the metadata, and the notification, and present the notification to the occupant of vehicle 101 thereby alerting the occupant of the component state (which may also indicate that the occupant should schedule a service repair visit or stop operating the vehicle depending on a severity of the component state, thereby possibly improving the operating experience by ensuring operational safety).

Figure 2:
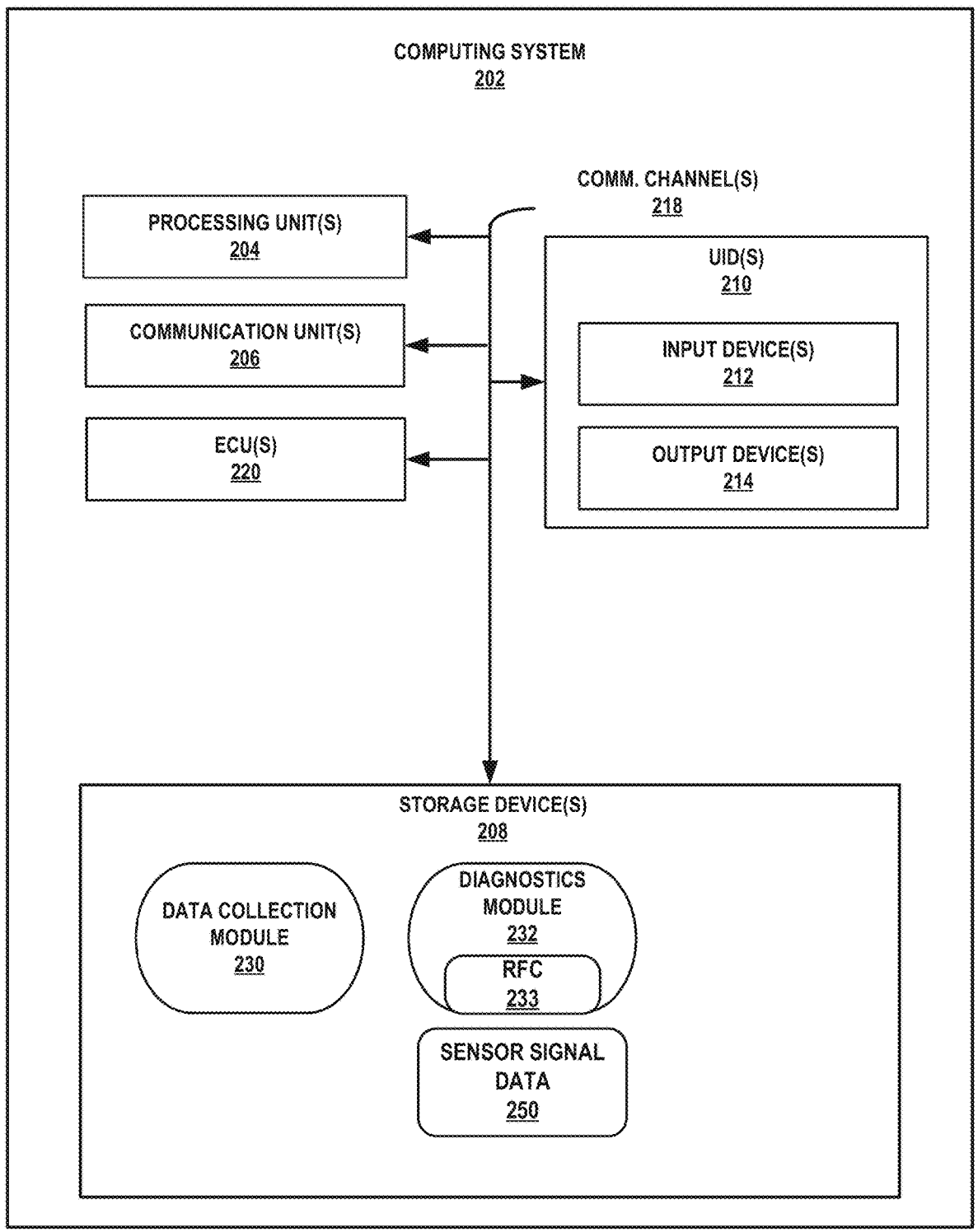
FIG. 2 is a block diagram illustrating an example computing system configured to perform various aspects of the vehicle diagnostic techniques described in this disclosure.

FIG. 2 is a block diagram illustrating an example computing system configured to perform various aspects of the vehicle diagnostic techniques described in this disclosure. Computing system 202 represents an example of computing system 102 described above with reference to FIG. 1. As illustrated in FIG. 2, computing system 202 includes at least one processing unit 204, at least one communication unit 206, at least one storage device 208, at least one user interface device (UID) 210, at least one communication channel 218, and one or more ECUs 220. FIG. 2 illustrates only one particular example of computing system 202, and many other examples of computing system 202 may be used in other instances and may include a subset of the components included in example computing system 202 or may include additional components not shown in FIG. 2.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

Communication units 206 may represent a unit configured to communicate with one or more other computing devices by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., LTE) radios, Bluetooth™ radios, WiFi™ radios, or any other wireless radios.

In some examples, storage device 208 may represent a unit configure to store one or more modules, such as data collection module 230 and diagnostics module 232 shown in FIG. 2. Storage device 208 may be a temporary memory, meaning that a primary purpose of storage device 208 is not long-term storage. Storage device 208 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 to perform the techniques of this disclosure. For example, storage device 208 may include data or information associated with one or more modules 230 and 232.

User interface devices (UID) 210 may represent a unit configured to enable a user to interact with computing device 202. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

ECUs 220 may represent one or more electronic control units configured to control electronics and various subsystems of vehicle 101, such as the above noted ABS and ESC system. ECUs 220 may each be implemented as an embedded system, which may include a microcontroller or other type of processor, memory, inputs, and outputs as noted above. ECUs 220 may interface with one or more of sensors 104 (FIG. 1) in the manner described above in support of the electronics and/or subsystems.

Communication channels 218 may represent a unit configured to interconnect each of components 204, 206, 208, 210, and/or 220 for inter-component communications (physically, communicatively, and/or operatively). In some examples, communication channels 218 may include a system bus, a network connection, one or more inter-process communication data structures, or any other components for communicating data.

As further shown in the example of FIG. 2, storage device 208 stores a data collection module 230 and an diagnostics module 232. Processing units 204 may interface with storage device 208 to retrieve one or more instructions of data collection module 230 that, when executed, cause processing units 204 to perform operations directed to collection of sensor signal data 250 from ECUs 220 via communication channels 218. Similarly, processing units 204 may interface with storage device 208 to retrieve one or more instructions of diagnostics module 232 that, when executed, cause processing units 204 to perform operations directed to identifying, based on sensor signal data 250, one or more components of vehicle 101 that result in the change of vibrations during operation of vehicle 101, as discussed above. Reference to modules 230 and 232 performing various operations should be understood to refer to processing units 204 performing the various operations discussed with respect to each of modules 230 and 232.

In any event, data collection module 230 may execute one or more communication protocols, such as the above noted controller area network (CAN) communication protocol, the FlexRay communication protocol or any other communication protocol, to interface with ECUs 220 and thereby indirectly interface with the associated ones of sensors 104. In some examples, data collection module 230 may interface directly with sensors 104 to collect sensor signal data 250. Sensor signal data 250 may represent data indicative of sensor signals output by sensors 104. Data collection module 230 may store sensor signal data 250 to storage device 208. After sufficient data (which is discussed in more detail below with respect to FIGS. 3A-3F) is collected, data collection module 230 may invoke diagnostics module 232.

Diagnostics module 232 may apply a trained classifier (e.g., a random forest classifier—RFC—233) with respect to sensor signal data 250 to identify one or more components of the vehicle that result in change of vibrations during operation of vehicle 101. RFC 233 may be trained using machine learning. Machine learning may generally enable a computing device to analyze input data and identify an action to be performed responsive to the input data. Each machine learning model (which in this example is assumed to be RFC 233) may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof. Examples of machine learning models include nearest neighbor, naïve Bayes, decision trees, linear regression, support vector machines, neural networks, k-Means clustering, Q-learning, temporal difference, deep adversarial networks, evolutionary algorithms, or other models trained using supervised, unsupervised, semi-supervised, or reinforcement learning algorithms, or combinations of any of the foregoing, such as RFC 233.

Examples of training data that may train RFC 233 to identify the one or more components of vehicle 101 that result in the change of vibrations during the operation of vehicle 101 are described below with respect to the examples shown in FIGS. 3A-3F. It is assumed for purposes of illustration that RFC 233 is trained using supervised learning based on the labeled data identified in the following FIGS. 3A-3F. FIGS. 3A-3F are diagrams illustrating graphs in which various sensor signals are shown to allow a trained classifier to perform various aspects of the diagnostics techniques described in this disclosure.

Figure 3A:
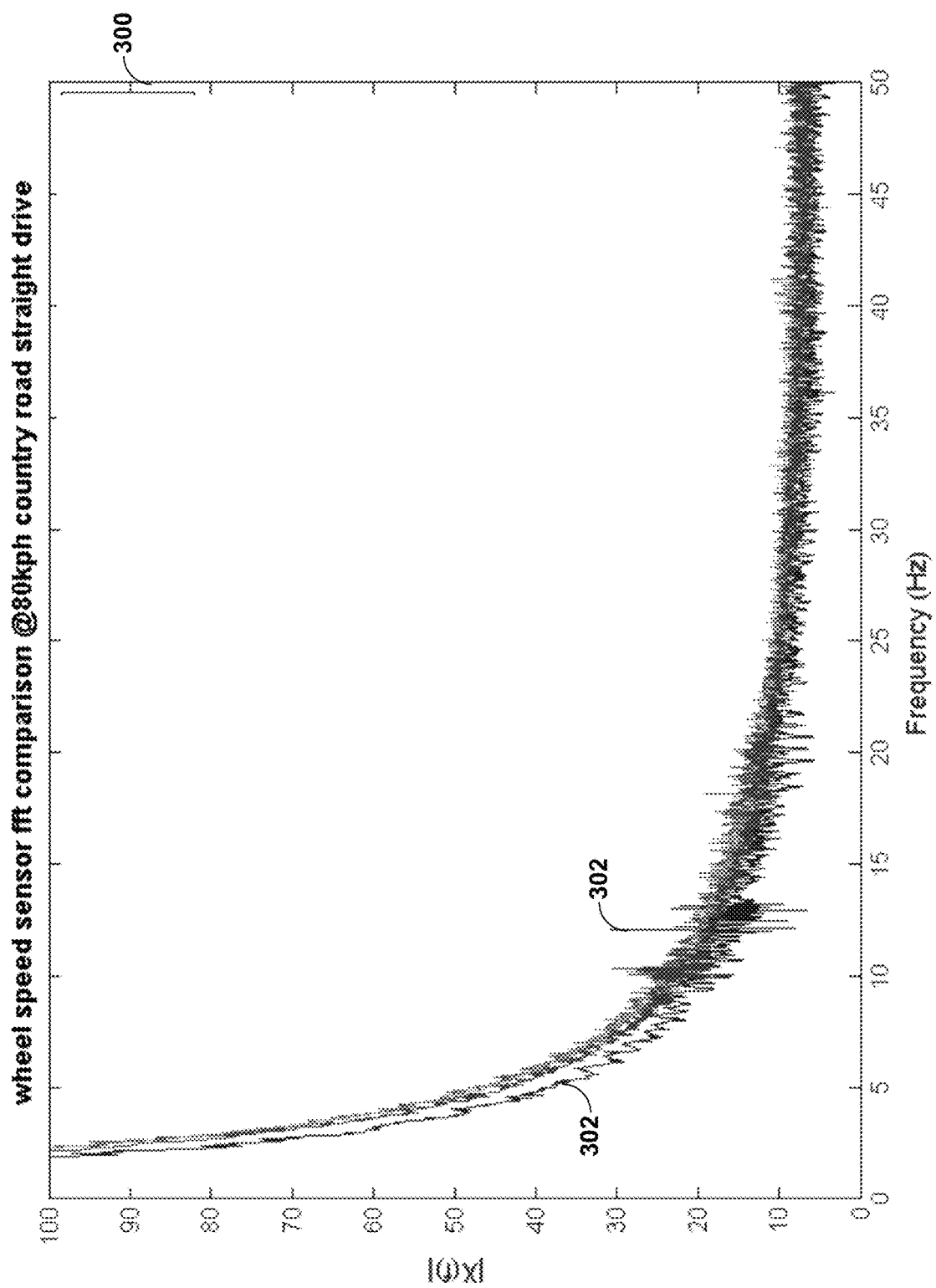
FIGS. 3A-3F are diagrams illustrating graphs in which various sensor signals are shown to allow a trained classifier to perform various aspects of the diagnostics techniques described in this disclosure.

Referring first to the example of FIG. 3A, a graph 300 illustrates wheel speed sensor signal data collected during operation of vehicle 101 when traveling at a speed of 80 kilometers per hour (KPH) on a straight country road. Data collection module 230 may, prior to storing sensor signal data 250, apply various transforms or other data conditioning algorithms to sensor signal data 250 (FIG. 2). For example, data collection module 230 may apply a fast Fourier transform (FFT) with respect to the wheel speed sensor signal data to transform the wheel speed sensor signal data from the time domain to the frequency domain. As such, the wheel speed sensor signal data shown in graph 300 is in the frequency domain; hence the x-axis label refers to a frequency in hertz (Hz). The y-axis of graph 300 is a magnitude of the wheel speed sensor signal data.

In any event, graph 300 shows wheel speed sensor data for a front right wheel, a front left wheel, a rear right wheel, and a rear left wheel. In the example of graph 300, there is a group of similar signals (from the front right wheel, the rear right wheel, and the rear left wheel) and an outlier signal 302 from the front left wheel, which has been tagged as having a noisy wheel hub. As such, RFC 233 may be trained (e.g., via supervised learning using manually labeled forms of the wheel speed sensor signal data 250) to identify, using the wheel speed sensor signal data 250 forming the basis of graph 300, a noisy wheel hub that results in the change of vibrations during operation of vehicle 101.

Figure 3B:
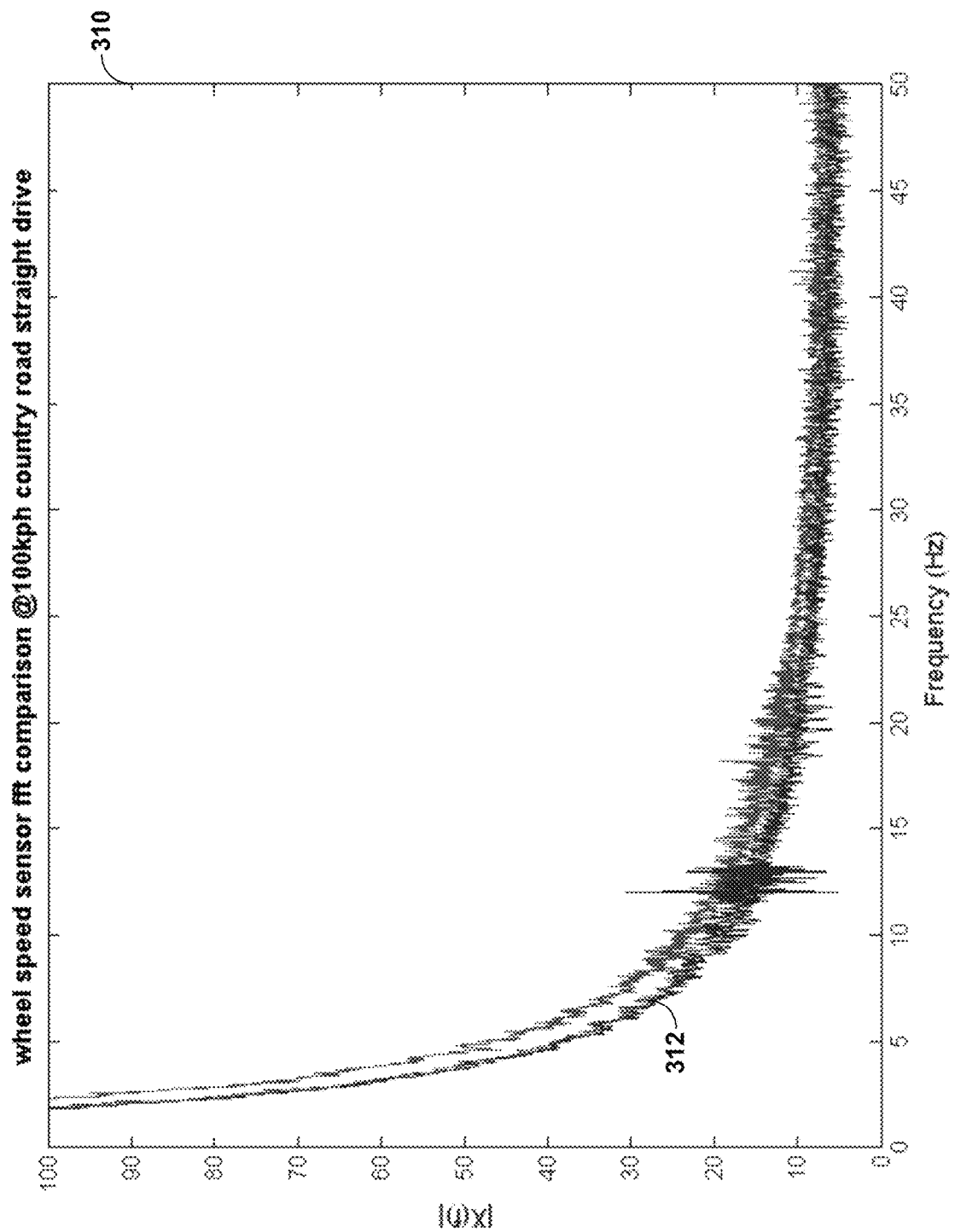

Referring next to the example shown in FIG. 3B, a graph 310 illustrates wheel speed sensor signal data collected during operation of vehicle 101 when traveling at a speed of 100 kilometers per hour (KPH) on a straight country road. Data collection module 230 may apply a fast Fourier transform (FFT) with respect to the wheel speed sensor signal data to transform the wheel speed sensor signal data from the time domain to the frequency domain. As such, the wheel speed sensor signal data shown in graph 310 is in the frequency domain; hence the x-axis label refers to a frequency in hertz (Hz). The y-axis of graph 310 is a magnitude of the wheel speed sensor signal data.

Graph 310 shows wheel speed sensor data for a front right wheel, a front left wheel, a rear right wheel, and a rear left wheel. In the example of graph 310, there is a group of similar signals (from the front right wheel, the rear right wheel, and the rear left wheel) and an outlier signal 312 from the front left wheel, which has been tagged as having a noisy wheel hub. As such, RFC 233 may be trained (e.g., via supervised learning using manually labeled forms of the wheel speed sensor signal data 250) to identify, using the wheel speed sensor signal data 250 forming the basis of graph 310, a noisy wheel hub that results in the change of vibrations during operation of vehicle 101.

Figure 3C:
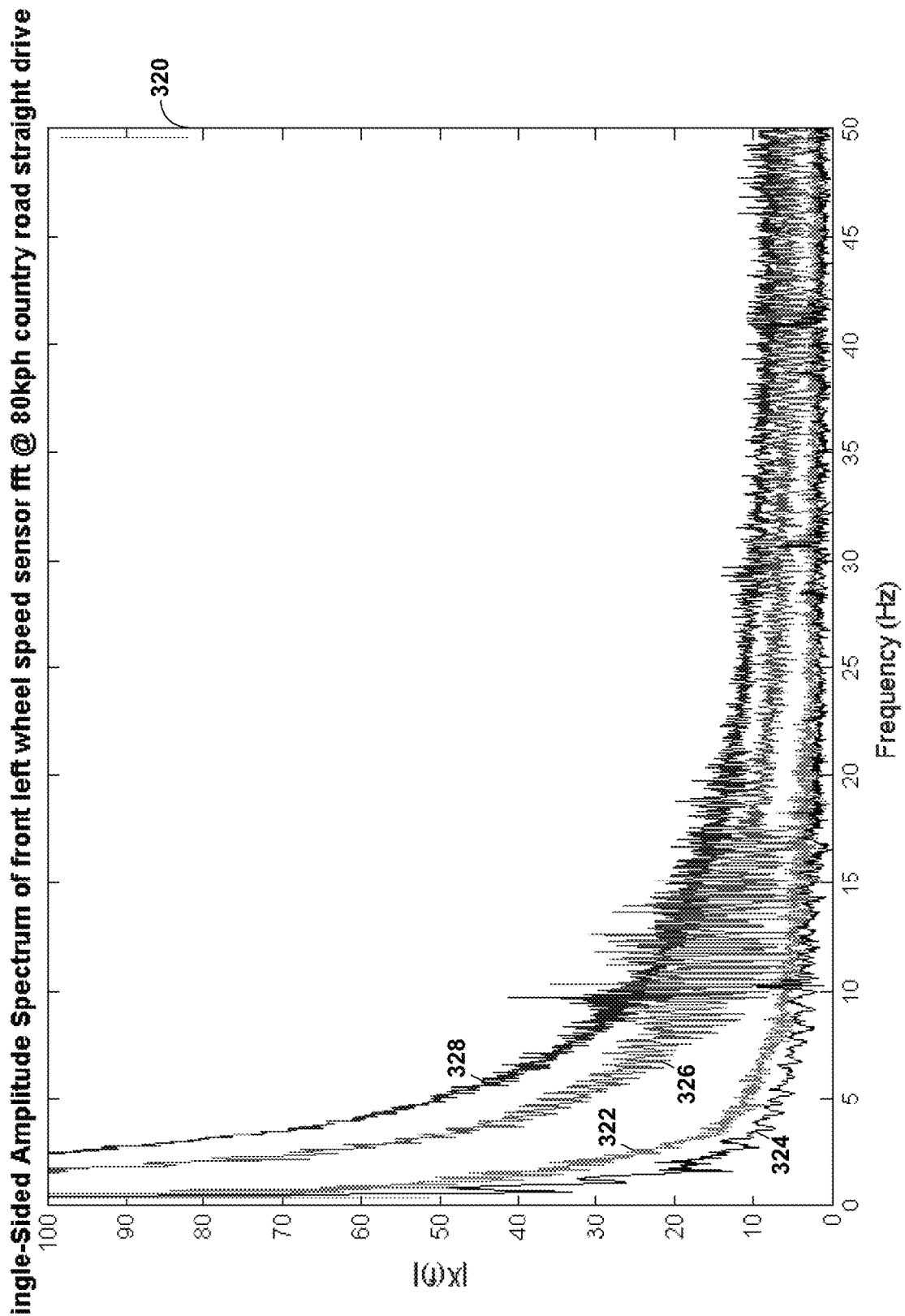

In the example shown in FIG. 3C, a graph 320 illustrates wheel speed sensor signal data collected during operation of vehicle 101 when traveling at a speed of 80 kilometers per hour (KPH) on a straight country road. Data collection module 230 may apply a fast Fourier transform (FFT) with respect to the wheel speed sensor signal data to transform the wheel speed sensor signal data from the time domain to the frequency domain. As such, the wheel speed sensor signal data shown in graph 320 is in the frequency domain; hence the x-axis label refers to a frequency in hertz (Hz). The y-axis of graph 320 is a magnitude of the wheel speed sensor signal data.

Graph 320 shows wheel speed sensor data for a front left wheel of a vehicle having a number of different components that result in the change of vibrations during operation of the vehicle. In the example of graph 320, wheel speed signal 322 represents a reference vehicle having little to no change in vibrations during operation of the vehicle. Wheel speed signal 324 represents wheel speed of a front left wheel having low tire pressure, while wheel speed signal 326 represents a wheel speed signal of a front left tire with a noisy damper. Wheel speed signal 328 represents a wheel speed signal of a front left tire with a noisy wheel hub. RFC 233 may be trained (e.g., via supervised learning using manually labeled forms of the wheel speed sensor signal data 250) to identify, using the wheel speed sensor signal data 250 forming the basis of graph 320, between a low tire pressure, noisy damper, and noisy wheel hub.

Figure 3D:
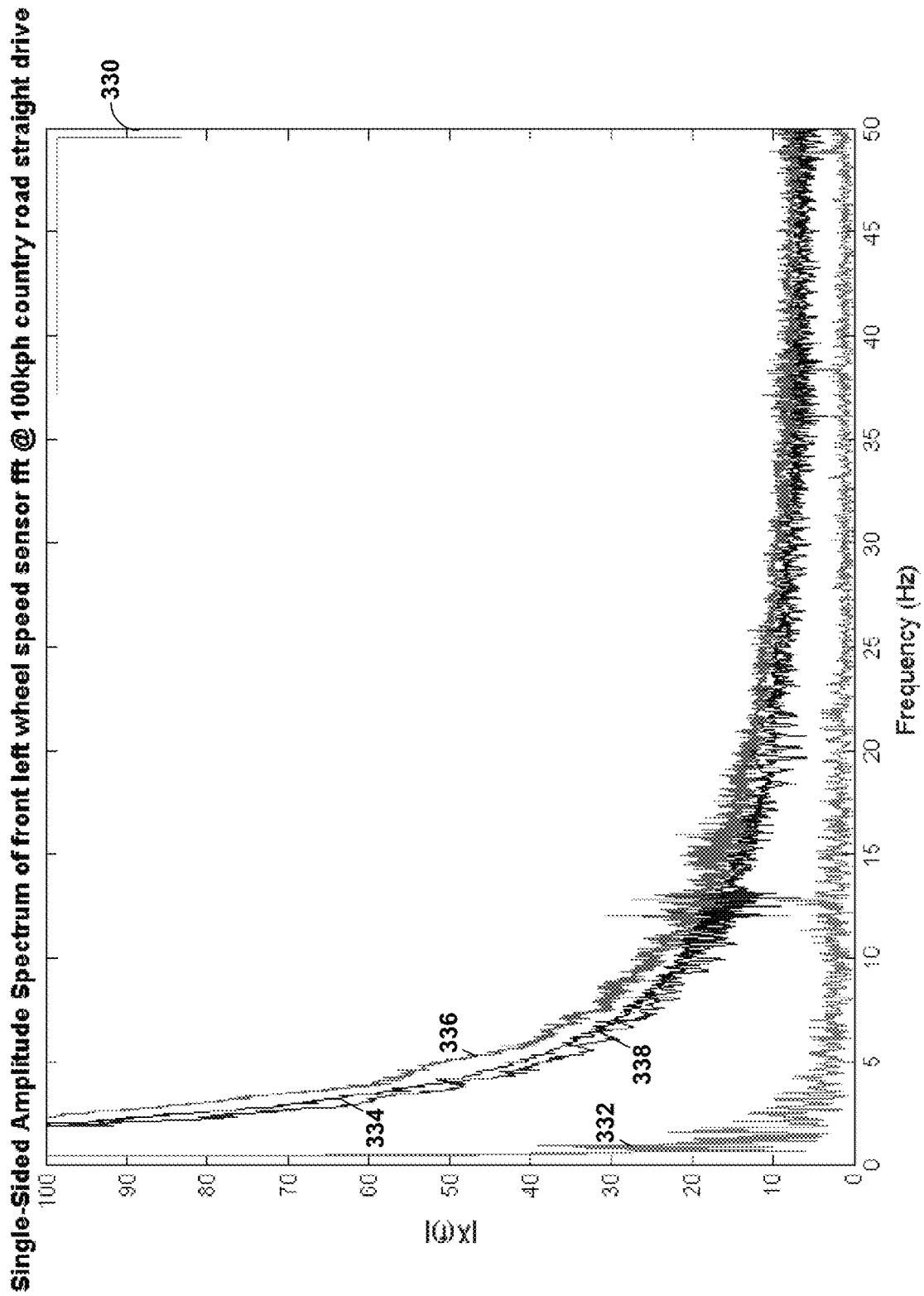

In the example shown in FIG. 3D, a graph 330 illustrates wheel speed sensor signal data collected during operation of vehicle 101 when traveling at a speed of 100 kilometers per hour (KPH) on a straight country road. Data collection module 230 may apply a fast Fourier transform (FFT) with respect to the wheel speed sensor signal data to transform the wheel speed sensor signal data from the time domain to the frequency domain. As such, the wheel speed sensor signal data shown in graph 330 is in the frequency domain, hence the x-axis label referring to a frequency in hertz (Hz). The y-axis of graph 330 is a magnitude of the wheel speed sensor signal data.

Graph 330 shows wheel speed sensor data for a front left wheel of a vehicle having a number of different components that result in the change of vibrations during operation of the vehicle. In the example of graph 330, wheel speed signal 332 represents a reference vehicle having little to no change of vibrations during operation of the vehicle. Wheel speed signal 334 represents wheel speed of a front left wheel having low tire pressure, while wheel speed signal 336 represents a wheel speed signal of a front left tire with a noisy damper. Wheel speed signal 338 represents a wheel speed signal of a front left tire with a noisy wheel hub. RFC 233 may be trained (e.g., via supervised learning using manually labeled forms of the wheel speed sensor signal data 250) to identify, using the wheel speed sensor signal data 250 forming the basis of graph 330, between a low tire pressure, noisy damper, and noisy wheel hub.

Figure 3E:
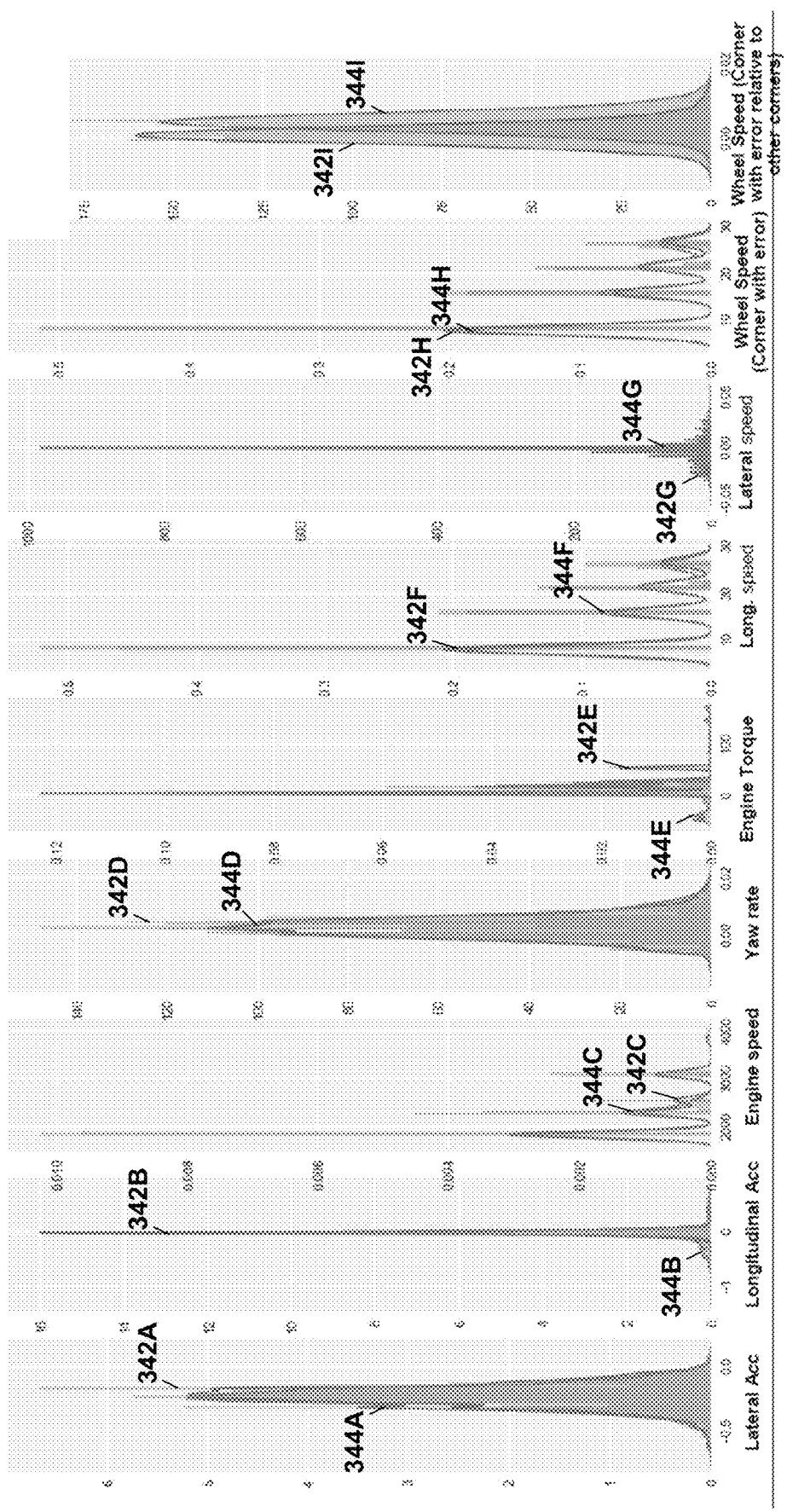

In the example shown in FIG. 3E, a collection of graphs 340 illustrates sensor signals 342A-342I ("sensor signals 342") and 344A-344I ("sensor signals 344"), where sensor signals 342 represent sensor signals for normal tire pressure while sensor signals 344 represent sensor signals for low tire pressure. Sensor signals 342 include sensor signals for lateral acceleration, longitudinal acceleration, engine speed, yaw rate, engine torque, longitudinal speed, lateral speed, wheel speed (corner with error), and relative wheel speed (corner with error relative to other corners). Likewise, sensor signals 344 include sensor signals for lateral acceleration, longitudinal acceleration, engine speed, yaw rate, engine torque, longitudinal speed, lateral speed, wheel speed (corner with error), and relative wheel speed (corner with error relative to other corners). RFC 233 may be trained (e.g., via supervised learning using manually labeled forms of the wheel speed sensor signal data 250) to identify, using sensor signal data 250 forming the basis of graphs 340, between normal tire pressure and low tire pressure.

Figure 3F:
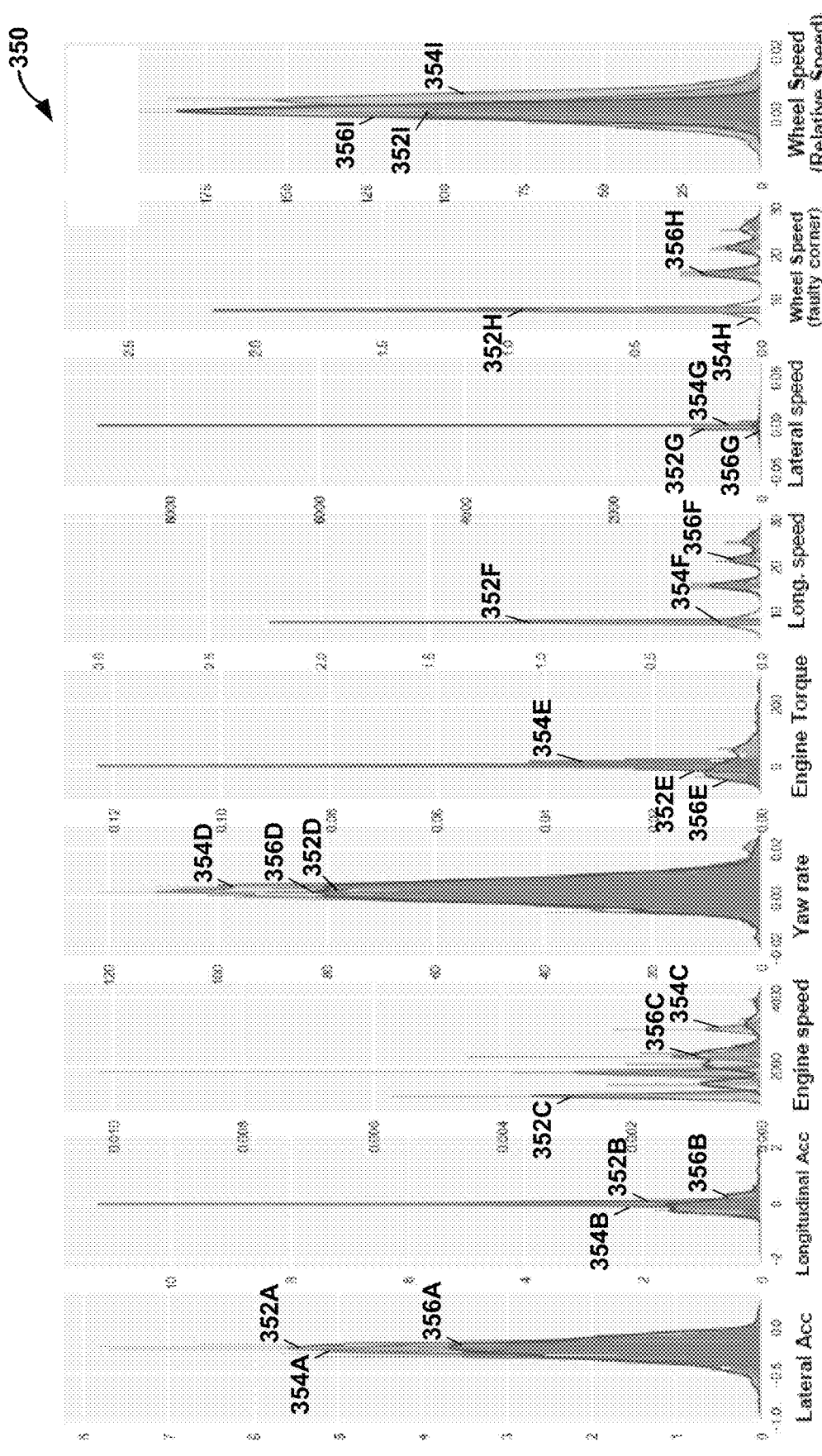

In the example shown in FIG. 3F, a collection of graphs 350 illustrates sensor signals 352A-352I ("sensor signals 352"), 354A-354I ("sensor signals 354"), and 356A-356I ("sensor signals 356"). Sensor signals 352 represent sensor signals for normal tire pressure. Sensor signals 354 represent sensor signals for low tire pressure. Sensor signals 342 represent sensor signals for a wheel having a noisy and/or imbalanced hub.

Sensor signals 352, 354, and 356 each include sensor signals for lateral acceleration, longitudinal acceleration, engine speed, yaw rate, engine torque, longitudinal speed, lateral speed, wheel speed (corner with error), and relative wheel speed (corner with error relative to other corners). RFC 233 may be trained (e.g., via supervised learning using manually labeled forms of the wheel speed sensor signal data 250) to identify, e.g., distinguish—using sensor signal data 250 forming the basis of graphs 350, between normal tire pressure, low tire pressure, and a noisy and/or imbalanced hub.

Figure 4A:
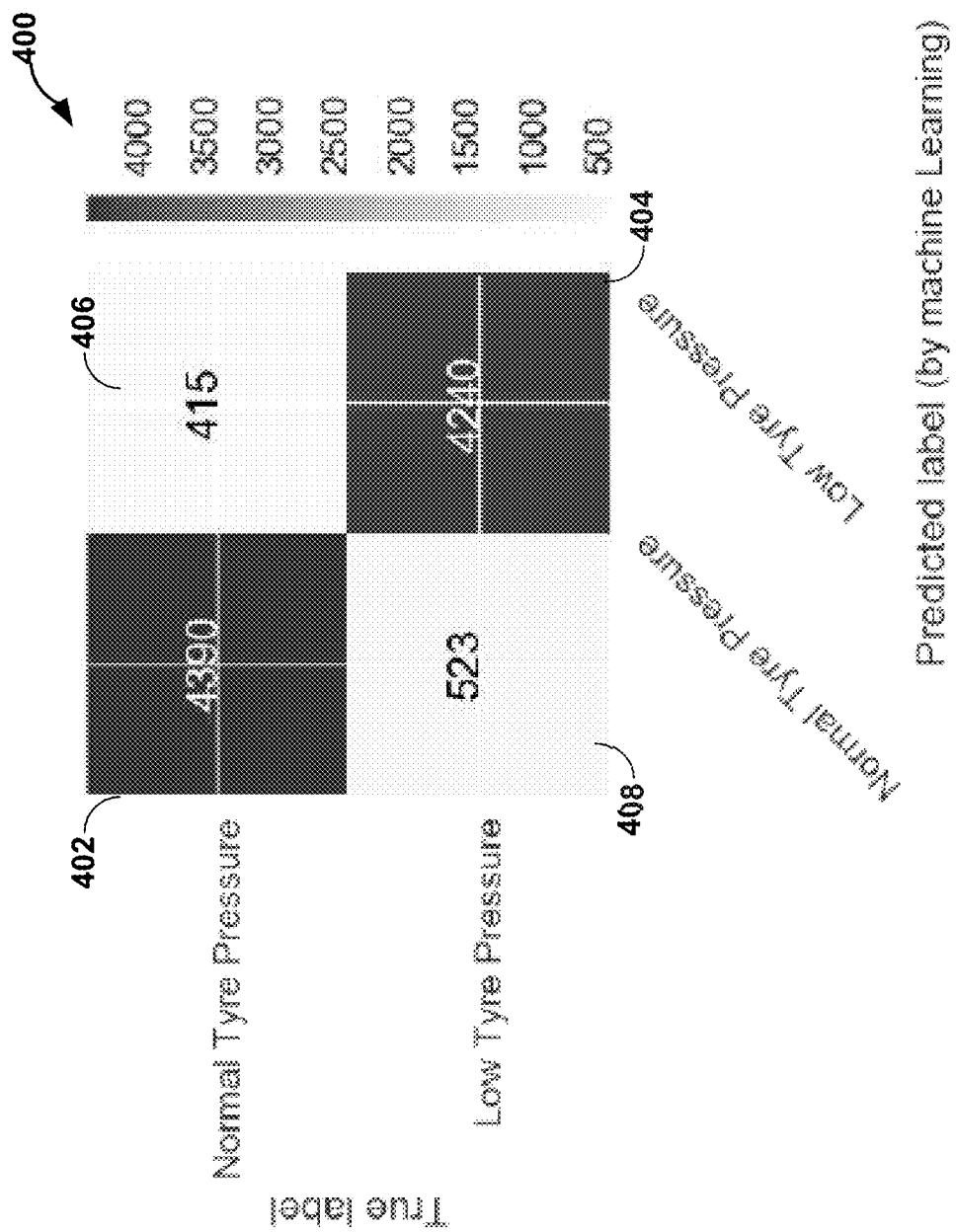
FIGS. 4A-4D are diagrams illustrating results of applying the trained classifier in accordance with various aspects of the diagnostics techniques described in this disclosure.

FIGS. 4A-4D are diagrams illustrating results of applying of the trained classifier in accordance with various aspects of the diagnostics techniques described in this disclosure. In the example of FIG. 4A, the trained classifier (e.g., RFC 233 shown in the example of FIG. 2) may correctly identify (as shown in a box 402 of a box graph 400) a normal tire pressure 4,390 times and correctly identify (as shown in a box 404 of box graph 400) a low tire pressure 4,240 times. RFC 233 may incorrectly identify (as shown in a box 406) normal tire pressure 415 times and incorrectly identify (as shown in a box 408) a low tire pressure 523 times.

Figure 4B:
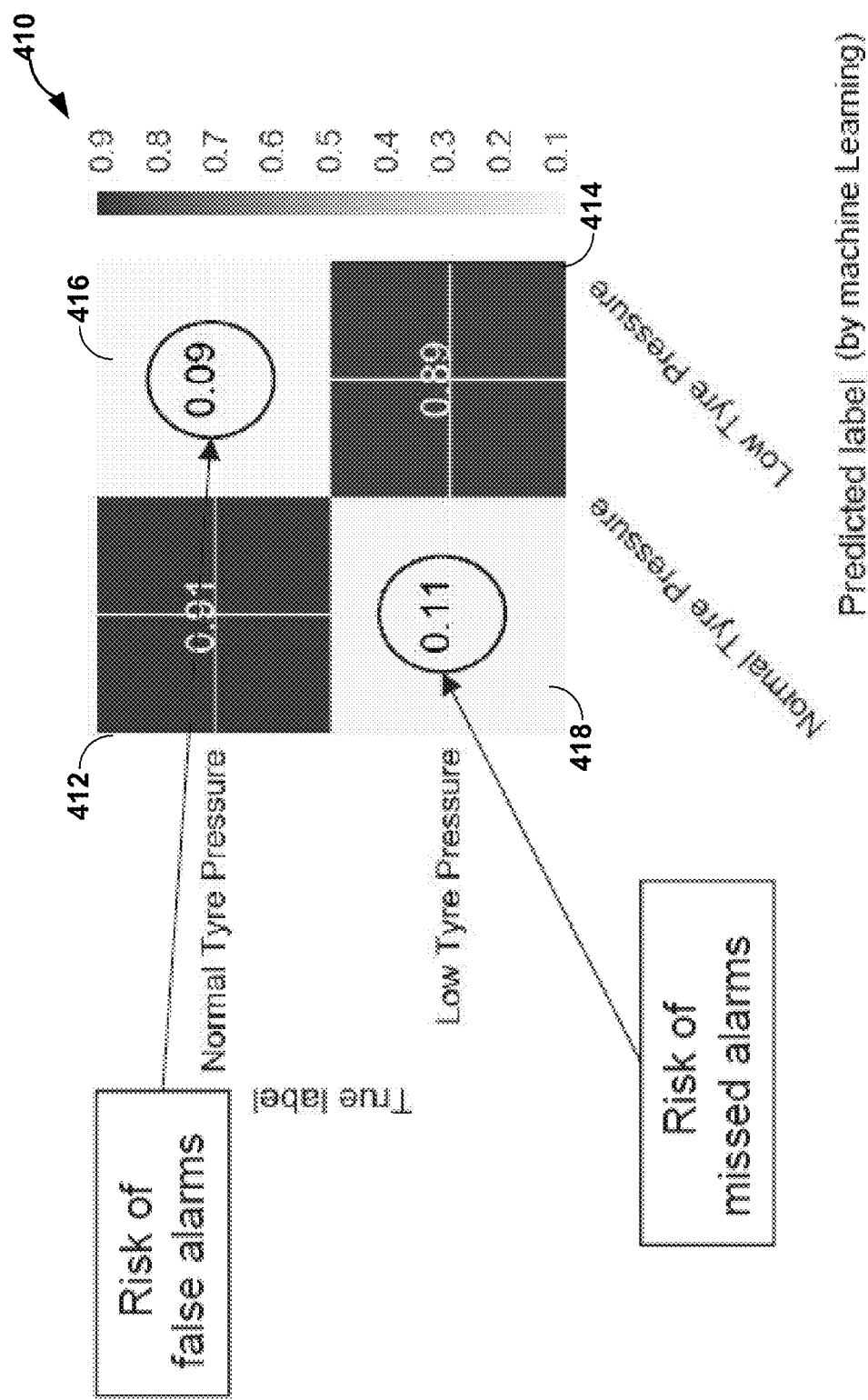

In the example of FIG. 4B, a box graph 410 reproduces the results shown in FIG. 4A but in terms of percentages, showing that RFC 233 may correctly identify (as shown in a box 412 of a box graph 410) a normal tire pressure 91% of the time and correctly identify (as shown in a box 414 of box graph 410) a low tire pressure 89% of the time. RFC 233 may incorrectly identify (as shown in a box 416) normal tire pressure 9% of the time and incorrectly identify (as shown in box 418) a low tire pressure 11% of the time.

Figure 4C:
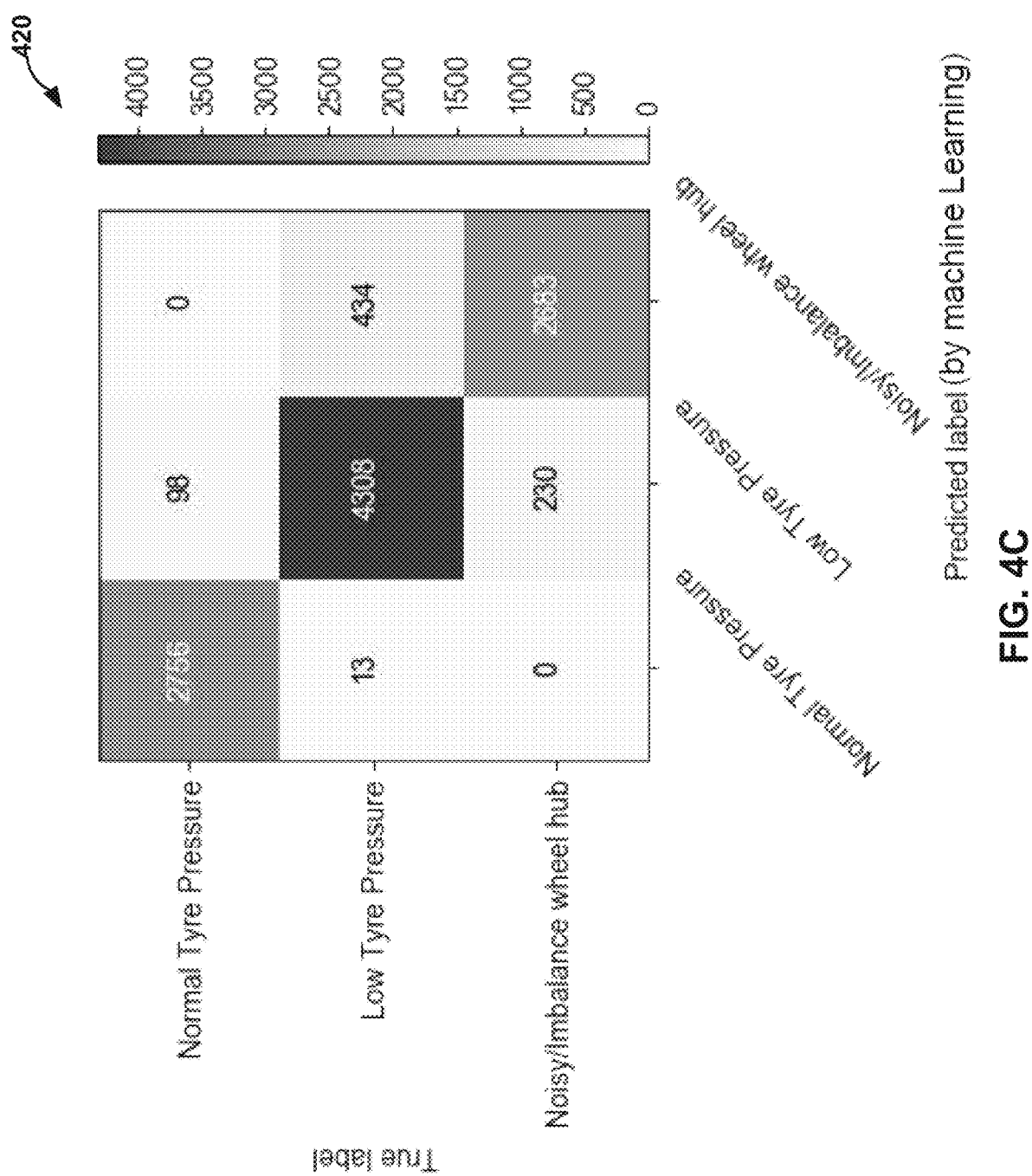
Figure 4D:
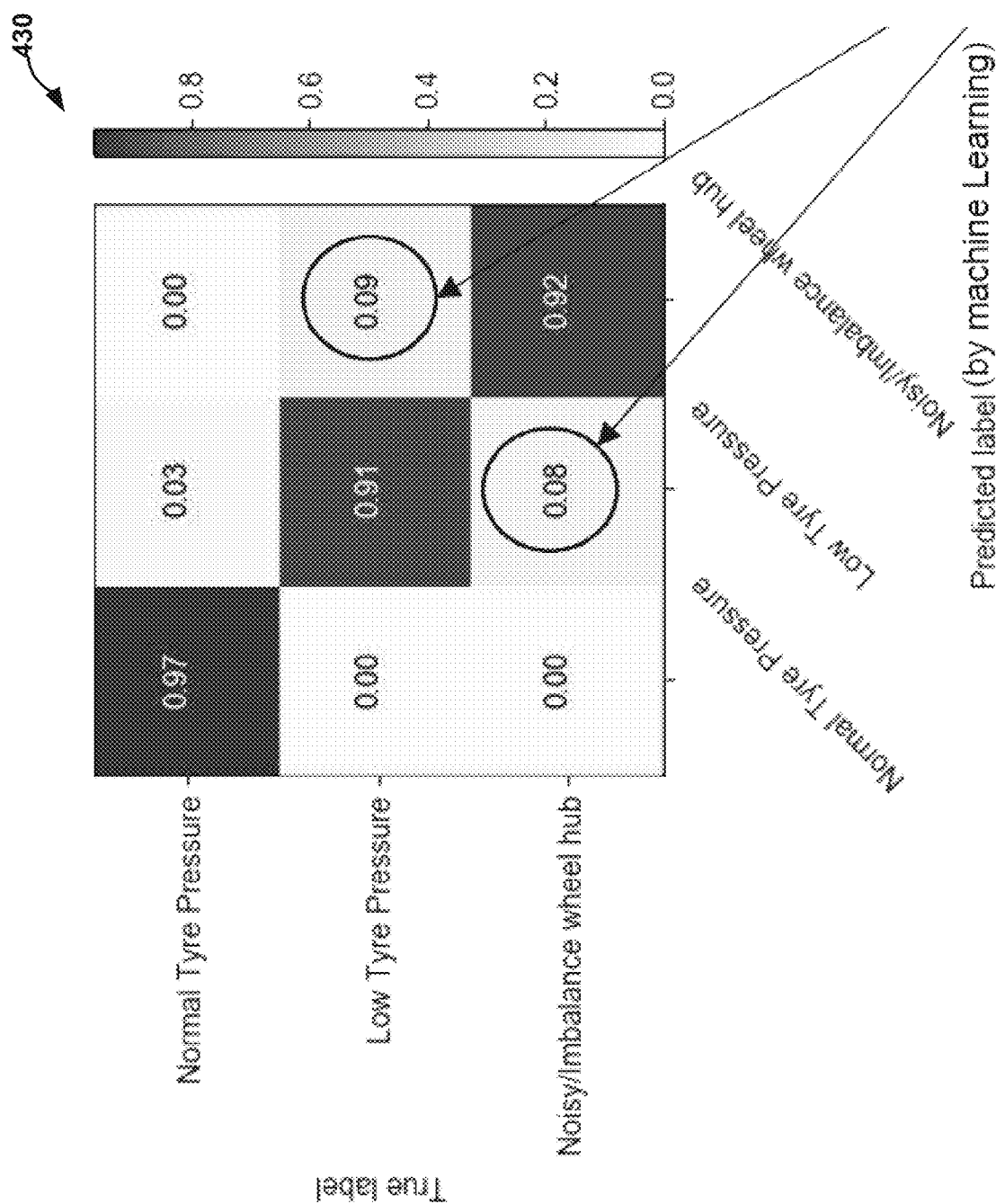

In the example of FIG. 4C, a box graph 420 is similar to box graph 400 except that results are shown for identifying the noisy and/or imbalanced wheel hub, which is correctly identified 2,683 times and incorrectly identified 434 times. In the example of FIG. 4D, a box graph 430 restates the results shown in box graph 420 in terms of percentages, where a noisy and/or imbalanced wheel hub is incorrectly identified 9% of the time but correctly identified 92% of the time. RFC 233 correctly identifies the normal tire pressure 97% of the time and the low tire pressure 91% and incorrectly identifies the normal tire pressure 3% of the time and the low tire pressure 9% of the time, showing that RFC 233 may benefit from the inclusion of multiple sensor signals during training.

Figure 5A:
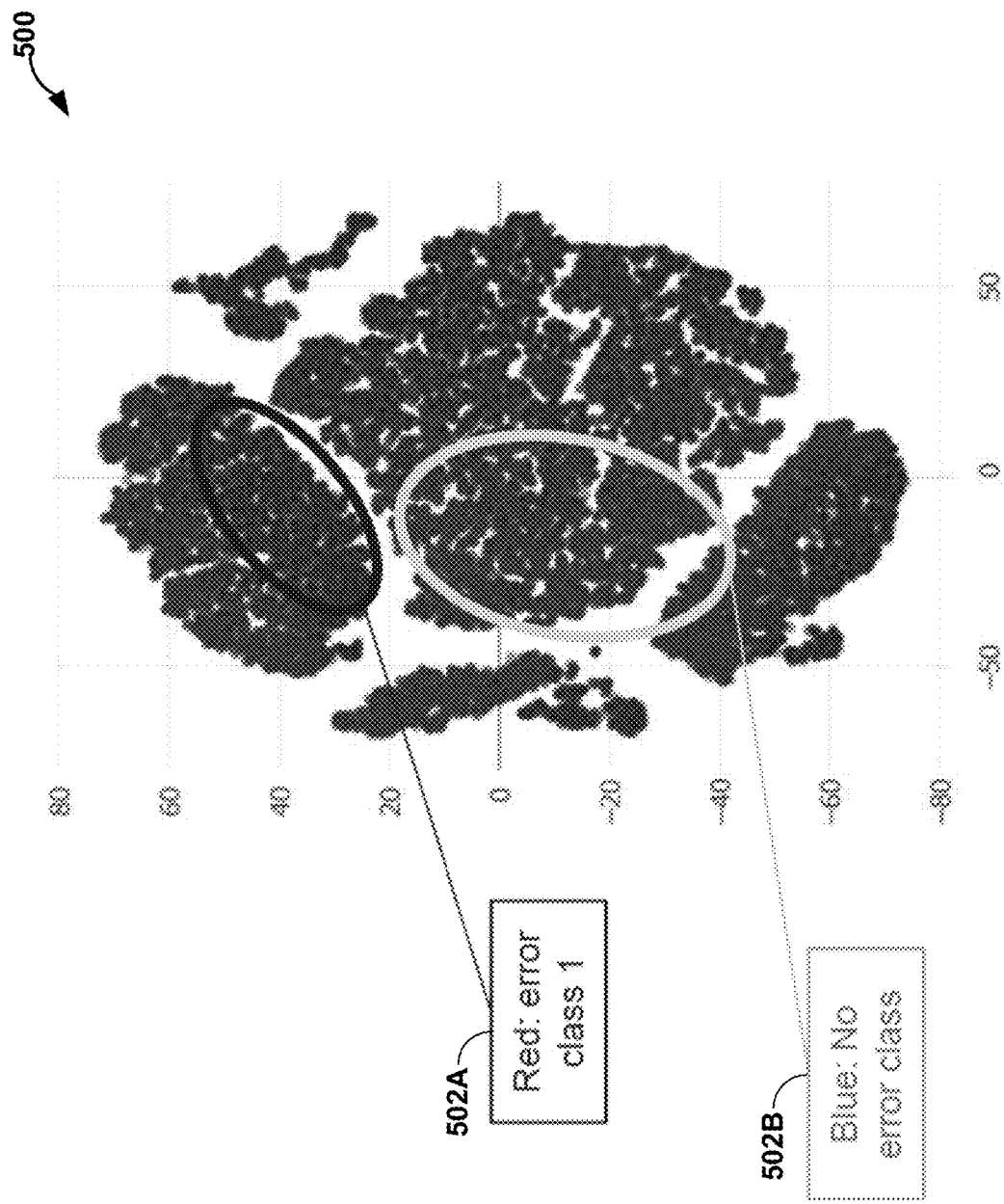
FIGS. 5A and 5B are diagrams illustrating results of application of the trained classifier in more detail.
Figure 5B:
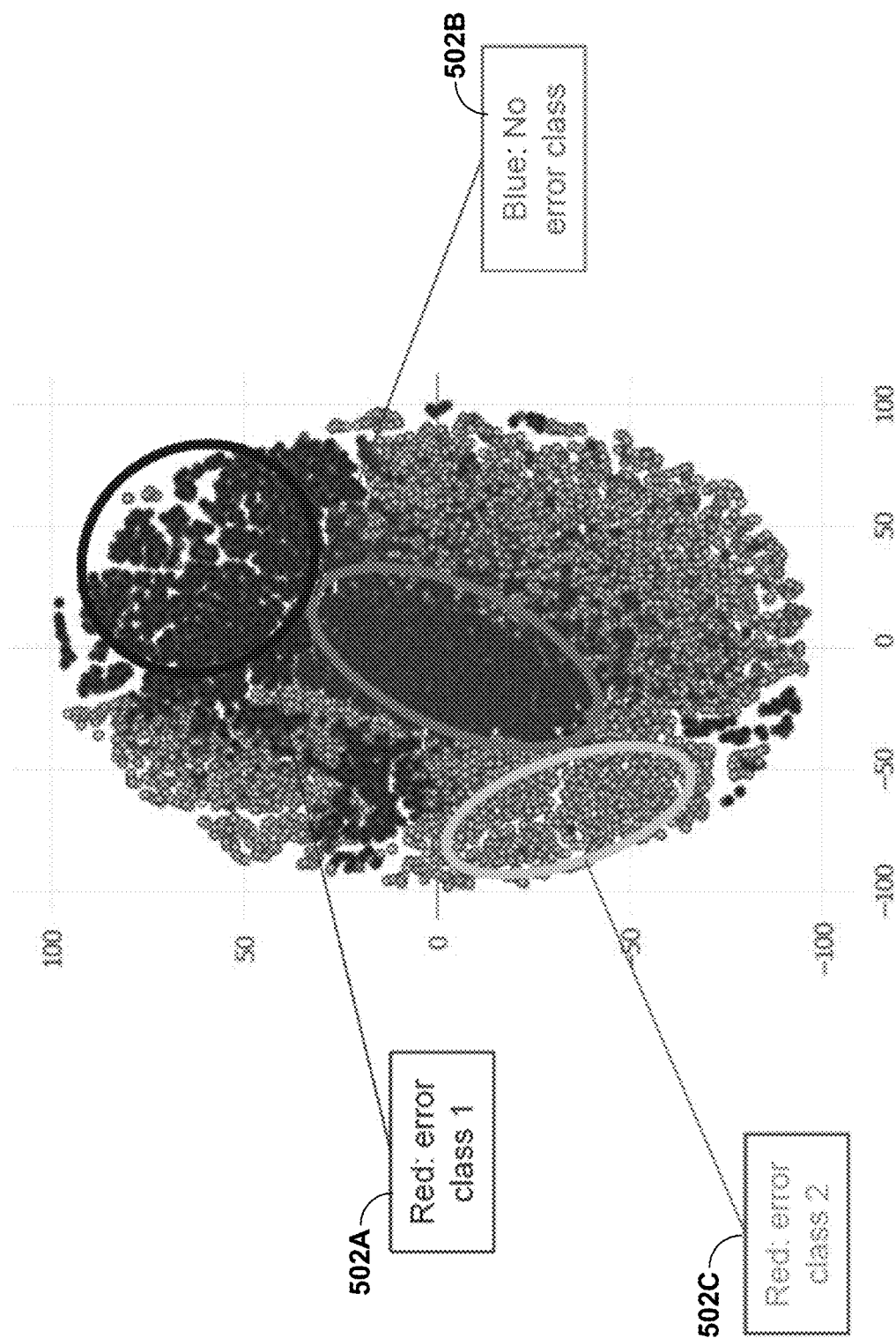

FIGS. 5A and 5B are diagrams illustrating results of application of the trained classifier in more detail. As shown in the example of FIG. 5A, the trained classifier (e.g., RFC 233 shown in the example of FIG. 2) may attempt to divide the feature space 500 to create clusters 502A and 502B at which different component states may exist. At cluster 502A, RFC 233 determines an error state (e.g., low tire pressure). At cluster 502B, RFC 233 determines that no error state exists (e.g., normal tire pressure). In the example of FIG. 5B, results of application of RFC 233 is shown after being trained to detect the noisy and/or imbalanced wheel hub, resulting in a third cluster 502C where there is high confidence in correctly detecting the noisy and/or imbalanced wheel hub.

In view of the foregoing, the following may be determined. In each state (error/non-error), RFC 233 may identify a certain amplitude peak between 10-20 Hz, where the maximum amplitude of the FFT and corresponding frequency of wheel speed sensor signal data for each error state is changing. RFC 233 may utilize this change in FFT of wheel speed signal data for detection of error state occurrence when operating vehicle 101. This stage may be referred to as a detection stage. Vehicle 101 may invoke communication unit 206 to also deliver sensor signal data 250 to remote system 120 for advanced analytics and diagnostics to develop more refined service and/or maintenance solutions.

Referring back to the example of FIG. 2, diagnostics module 232 may apply RFC 233 to sensor signal data 250 to identify one or more components that may result in the change of vibrations during operation of vehicle 101. RFC 233 may, as described above, be trained to fuse a number of different sensor signals (represented by sensor signal data 250) in order to identify the one or more components that result in the change of vibrations during operation of vehicle 101. Data collection module 230 may condition or otherwise transform some of sensor signal data 250, such as by applying the FFT to wheel speed sensor data 250 so as to transform the wheel speed sensor data 250 from the time domain to the frequency domain.

RFC 233 may represent a collection of different decision trees, each of which is applied to same sensor signal data 250 to arrive at an identified component. Each of the different identified components (or, in other words, results) may represent one or more votes, which are then summed to identify the one or more components of vehicle 101 that result in the change of vibrations during operation of vehicle 101. In other words, diagnostics module 232 may invoke RFC 233 with respect to sensor signal data 250, where RFC 233 applies the one or more decision trees to sensor signal data 250 to obtain one or more results. RFC 233 then sums the one or more results to identify the one or more components that result in the change of vibrations during operation of vehicle 101.

Diagnostics module 232 may obtain, based on the identified one or more components, a notification configured to inform an occupant of vehicle 101 of the one or more components of vehicle 101 that result in the change of vibrations during operation of vehicle 101. Diagnostics module 232 may interface with output devices 214 (e.g., a display) to present the notification.

As such, various aspects of the diagnostics techniques may promote safer operation of vehicle 101, as RFC 233 may more quickly and efficiently (compared to previous diagnostic attempts) identify one or more components that result in the change of vibrations (which are harmful to driving quality and safety as well as damaging to the components of vehicle 101). Further, given the increased visibility into component issues, and the ability to provide both sensor signal data 250 and the diagnosis (e.g., the one or more components that result in the change of vibrations) to remote system 120, remote system 120 may allow designers to better understand when and/or why components break, thereby potentially reducing warranty costs, and reducing after market hardware failure. In addition, various aspects of the techniques may improve and/or shorten diagnostic and/or service, while also improving iTPMS.

Figure 6:
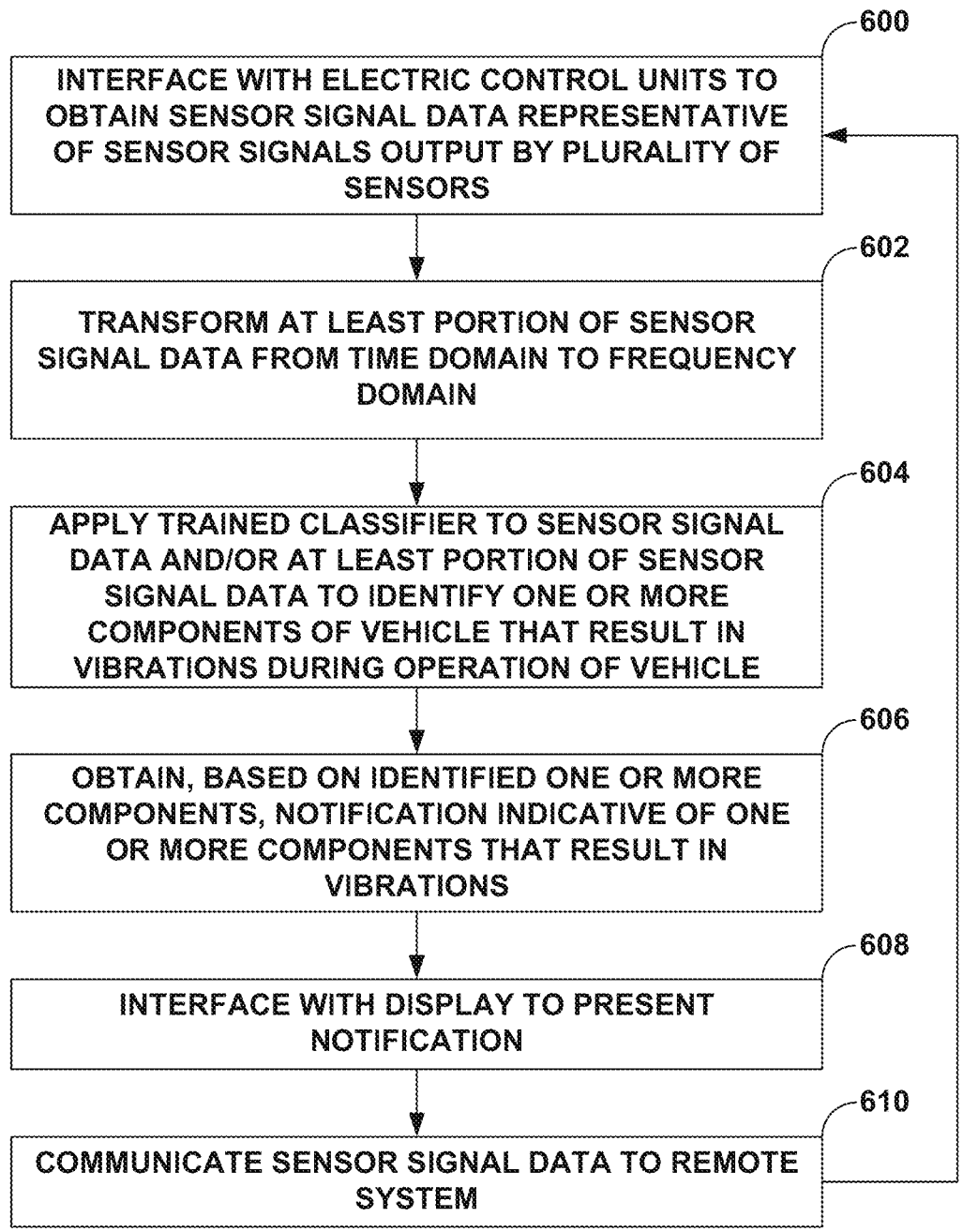
FIG. 6 is a flowchart illustrating example operation of the computing system shown in the example of FIG. 2 in performing various aspects of the machine-learning based vehicle diagnostics techniques described in this disclosure.

FIG. 6 is a flowchart illustrating example operation of the computing system shown in the example of FIG. 2 in performing various aspects of the machine-learning based vehicle diagnostics techniques described in this disclosure. Computing system 202 may first invoke data collection module 230 to interface with electronic control units (ECUs) 220 to obtain sensor signal data 250 representative of sensor signals output by a plurality of sensors 104 (600). Data collection module 230 may transform at least a portion of sensor signal data 250 from a time domain to a frequency domain (e.g., through application of a FFT) (602). Data collection module 230 may store the sensor signal data 250 and invoke diagnostics module 232.

Diagnostics module 232 may apply a trained classifier 233 to sensor signal data 250 (which may include the portion of sensor signal data 250 that was transformed from the time domain to the frequency domain) to identify one or more components of vehicle 101 that result in the change of vibrations during operation of vehicle 101 (604). Diagnostics module 232 may next obtain, based on the identified one or more components, a notification indicative of the one or more components that result in the change of vibrations (606). Diagnostics module 232 may interface with an output device 218 (e.g., a display) to present the notification (608), while also interfacing with communication units 206 to communicate sensor signal data 250 to remote system 120 (610). Computing device 202 may continue to operate this manner (600-610) to perform real-time or near-real-time chassis health monitoring (which is another way to refer to various aspects of the diagnostics techniques described in this disclosure).

Although described above with respect to a supervised learning model in which labeled data (e.g., the labeled FFT data for different conditions and/or components described above with respect to FIGS. 3A-3F) is used to train the model, e.g., RFC 233 shown in the example of FIG. 2, various aspects of the techniques may be directed to models trained using unsupervised learning in which unlabeled data is used to identify the one or more components of vehicle that result in the change of vibrations during operation of vehicle 101 shown in the example of FIG. 1.

Figure 7:
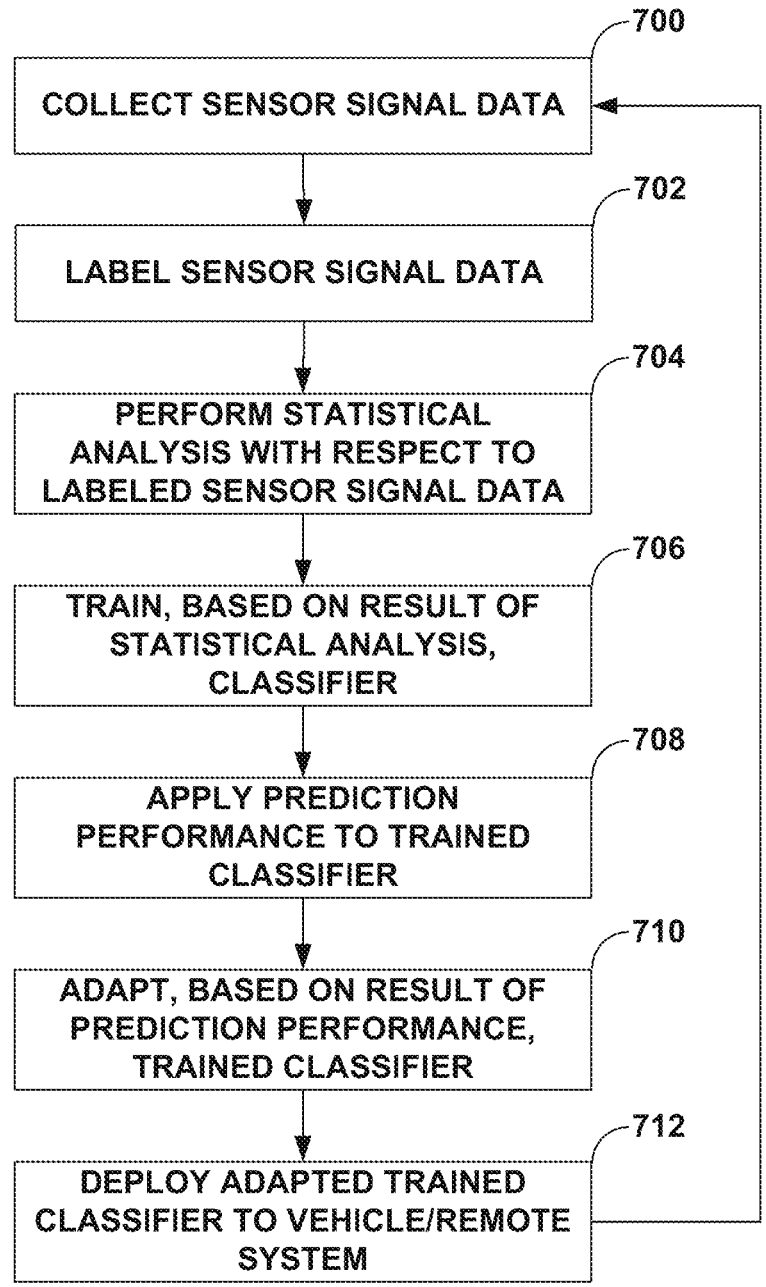
FIG. 7 is a flowchart illustrating example operation of a system for training the random forest classifier shown in FIG. 2 in accordance with various aspects of the techniques described in this disclosure.

That is, RFC 233 may be trained using supervised learning with labeled data as outlined in the example of FIG. 7. FIG. 7 is a flowchart illustrating example operation of a system for training the random forest classifier shown in FIG. 2 in accordance with various aspects of the techniques described in this disclosure.

In the example of FIG. 7, vehicle 101 may first be driven with one or more components in various different states of operation (e.g., a tire with low tire pressure, a tire with a noisy wheel hub, a chassis with a noisy damper, etc.). While being driven, computing system 102 (which is shown in more detail by way of example in FIG. 2 as computing system 202) of vehicle 101 may collect sensor signal data 250 (700). Computing system 202 may interface with communication unit 206 to transmit sensor signal data 250 via network 110 to remote system 120.

At remote system 120, a data specialist or other operator may label sensor signal data 250 (702) according to, as one or more examples, the state of operation, the components, the driving environment (type of road—straight or curvy, smooth or bumpt, etc., the weather or any other type of driving environment) and the like (702). The data specialist or other operator may next perform a statistical analysis with respect to labeled sensor signal data 250 (704), which forms the basis of developing the trained classifier (such as RFC 233). The data specialist may train, based on the result of the statistical analysis, a classifier, such as RFC 233 (006).

To verify the accuracy of the trained classifier, the data specialist may next apply prediction performance to the trained classifier (708), and thereby identify feature and/or signal importance. Examples of prediction performance is shown in the examples of FIGS. 4A-4D. Prediction performance may enable fine tuning of the trained classifier via additional training such that the trained classifier may better identify the features and/or signals of importance. As such, the data specialist may adapt, based on a result of the prediction performance, the trained classifier (710) to better identify the one or more components that result in the change of vibrations. The data specialist may then deploy the adapted trained classifier to vehicle 101 for onboard chassis health diagnostics and/or remote system 120 for maintenance scheduling (e.g., for fleet vehicles) (712).

When there are changes to the components of vehicle 101 that may change the sensor signal data collected during operation of vehicle 101 or otherwise adjust some feature of the sensor signal data collected during operation of vehicle 101, the data specialist may have to redo the foregoing operations in order to redevelop the trained classifier (700-712). The labeling of data, statistical analysis, and prediction performance may be time consuming and somewhat involved processes that, while potentially yielding good results, may be counteracted by the inability to automatically adapt to changing components (in terms of wear, replacement, etc.). In this respect, various aspects of the techniques are directed to a trained classifier that is trained using unsupervised learning based on unlabled data, which may reduce if not eliminate much of the manual intervention required for supervised learning using labeled data.

Figure 8:
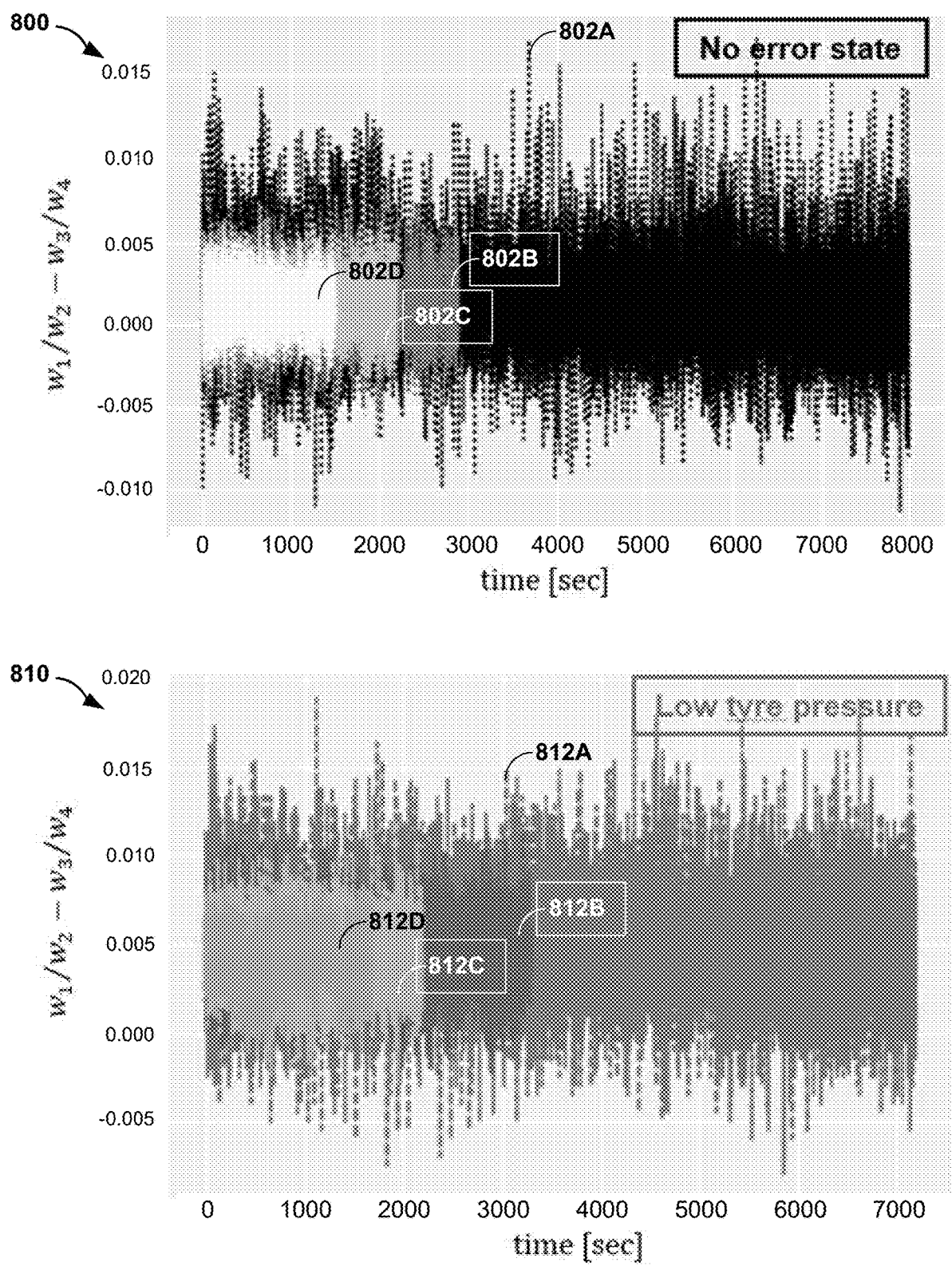
FIG. 8 is a diagram illustrating graphs of various sensor signals that are used as a basis for unsupervised learning in order to train a classifier to operate in accordance with various aspects of the techniques described in this disclosure.

FIG. 8 is a diagram illustrating graphs of various sensor signals that are used as a basis for unsupervised learning in order to train a classifier to operate in accordance with various aspects of the techniques described in this disclosure. As shown in the example of FIG. 8, graph 800 includes four signals 802A-802D. Each of signals 802A-802D is defined as the difference between a ratio of the wheel speed sensor signal for the front left wheel ($w_1$) to the wheel speed sensor signal for the front right wheel ($w_2$) and the wheel speed sensor signal for the back left wheel ($w_3$) to the wheel speed sensor signal for the back right wheel ($w_4$).

The signal 802A represents a plot of the foregoing difference in ratios when driving 30 kilometers per hour (kph). The signal 802B represents a plot of the foregoing difference in ratios when driving 60 kph. The signal 802C represents a plot of the foregoing difference in ratios when driving 80 kph. The signal 802D represents a plot of the foregoing difference in ratios when driving 100 kph. Each of signals 802A-802D are for a vehicle with no error state (e.g., meaning all components of the chassis are functioning correctly).

As further shown in the example of FIG. 8, graph 810 also includes four signals 812A-812D. Each of signals 812A-812D is defined as the difference between a ratio of the wheel speed sensor signal for the front left wheel ($w_1$) to the wheel speed sensor signal for the front right wheel ($w_2$) and the wheel speed sensor signal for the back left wheel ($w_3$) to the wheel speed sensor signal for the back right wheel ($w_4$).

The signal 812A represents a plot of the foregoing difference in ratios when driving 30 kph. The signal 812B represents a plot of the foregoing difference in ratios when driving 60 kph. The signal 812C represents a plot of the foregoing difference in ratios when driving 80 kph. The signal 812D represents a plot of the foregoing difference in ratios when driving 100 kph. Each of signals 802A-802D are for a vehicle with a low tire pressure state (e.g., meaning at least one of the four tires has a low pressure).

The remote system 120 may perform unsupervised learning premised upon signals 802A-802D and 812A-812D to obtain a classifier (or, in other words, a model) capable of identifying the one or more components of the vehicle responsible for the change in vibrations during operation of the vehicle (e.g., at the different speeds). In unsupervised learning, no labeling, statistical analysis or other analytics may be required, thereby potentially substantially reducing the manual oversight associated with supervised training of the model.

That is, in the above noted instance of supervised learning, the data analyst or other operator identifies error state labels, but does not immediately know which signal is important in identifying the one or more components that result in the change of vibrations during operation of vehicle 101 (in terms of contributing more than other signals in the error states of interest). The data analyst may, upon discovering these states of interest and corresponding important signals, design a classifier (e.g., RFC 233) capable of near-real-time or real-time identifying of the one or more components that result in the change of vibration. Yet, this classifier trained using supervised learning may not be used for automatic analysis of new data (as the classifier does not have any training data directed to the new data).

In using unsupervised learning to train a classifier, the resulting classifier is more general and does not require definite labels, thereby allowing the classifier to identify problems or faults based on new data (due to different components, conditions, etc.). Remote system 120 may generate, using unsupervised learning, a hidden Markov model (HMM) that performs clustering and tagging of the sensor signal data over time (which may also be referred to as a "time series"). Examples of results achieved using a classifier, such as the HMM, developed using unsupervised learning are described with respect to the following FIGS. 9A-9D.

Figure 9A:
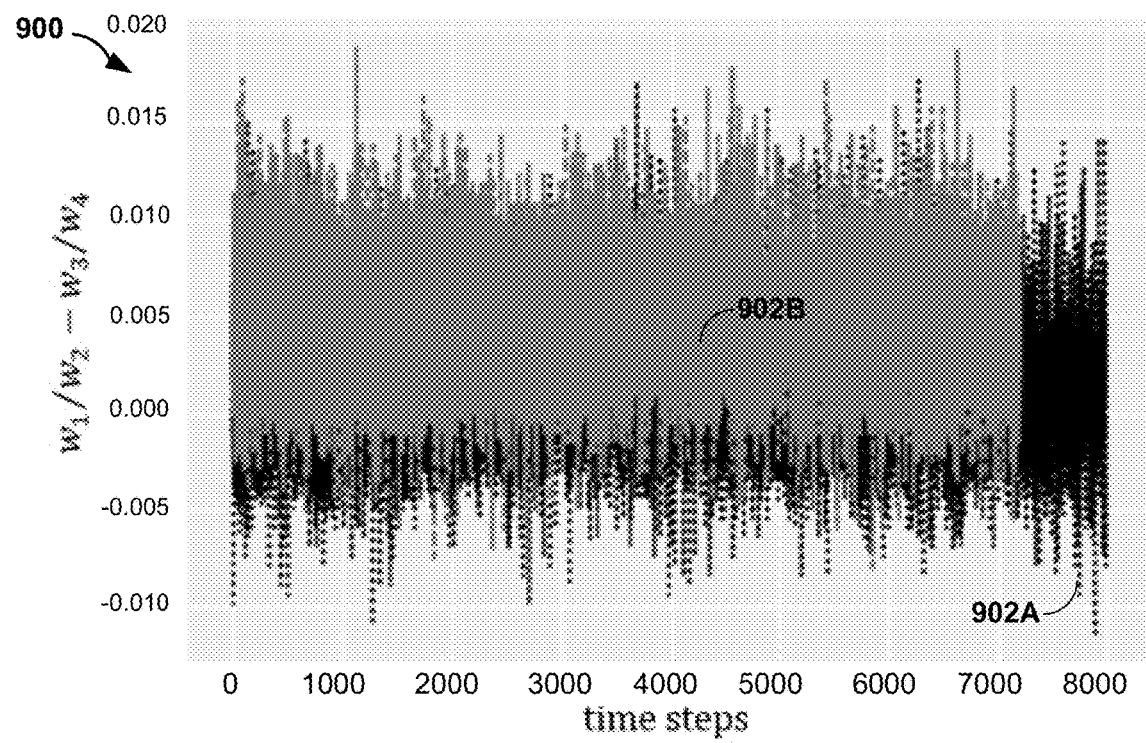
FIG. 9A-9D are diagrams illustrating graphs showing classification results from application of a classifier trained using unsupervised learning to sensor signal data in accordance with various aspects of the techniques described in this disclosure.

FIG. 9A-9D are diagrams illustrating graphs showing classification results from application of a classifier trained using unsupervised learning to sensor signal data in accordance with various aspects of the techniques described in this disclosure. In the example of FIG. 9A, graph 900 shows two signals 902A and 902B, where the HMM classifies signal 902A as being no error state and signal 902B as an error state (which in this instance is a low tire pressure state). Each of signals 902A and 902B is defined as the difference between a ratio of the wheel speed sensor signal for the front left wheel ($w_1$) to the wheel speed sensor signal for the front right wheel ($w_2$) and the wheel speed sensor signal for the back left wheel ($w_3$) to the wheel speed sensor signal for the back right wheel ($w_4$). The clustering accuracy of the HMM is approximately 100% for classifying signals obtained when operating vehicle 101 on a straight test track.

Figure 9B:
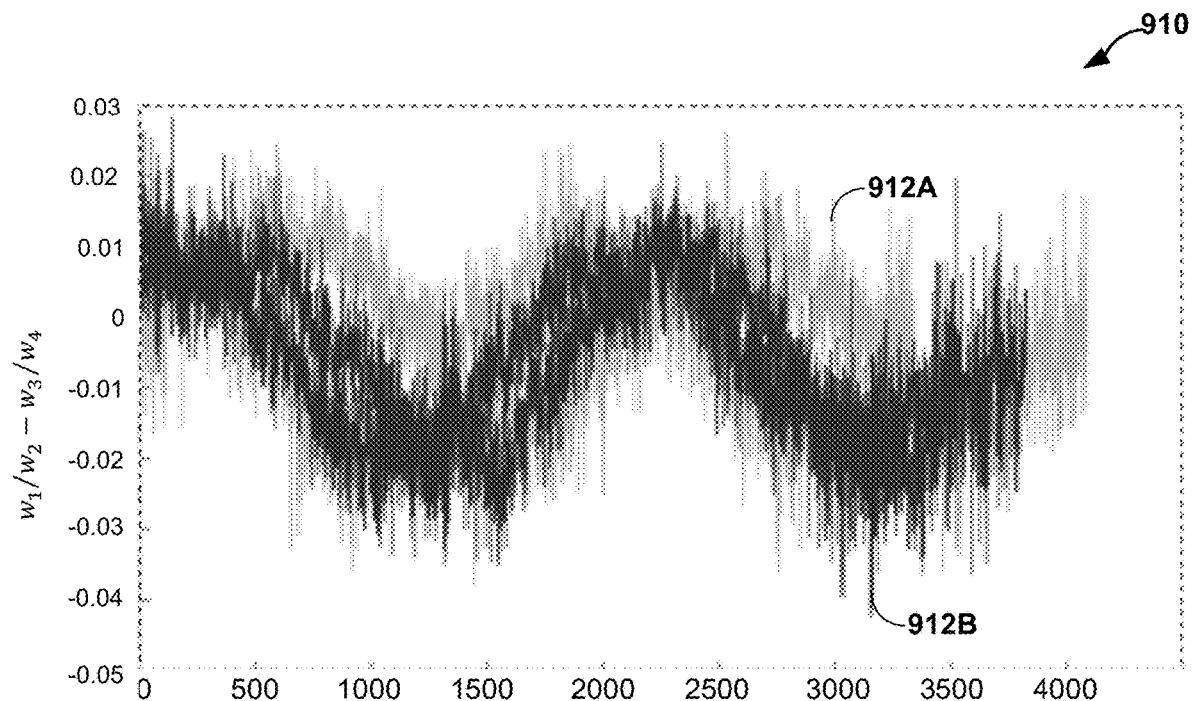

In the example of FIG. 9B, graph 910 shows two signals 912A and 912B, where the HMM classifies signal 912A as being no error state and signal 912B as an error state (which in this instance is a low tire pressure state). Each of signals 912A and 912B is defined as the difference between a ratio of the wheel speed sensor signal for the front left wheel (w1) to the wheel speed sensor signal for the front right wheel (w2) and the wheel speed sensor signal for the back left wheel (w3) to the wheel speed sensor signal for the back right wheel (w4). The clustering accuracy of the HMM is approximately 100% for classifying signals obtained when operating vehicle 101 in city traffic road with turns.

Figure 9C:
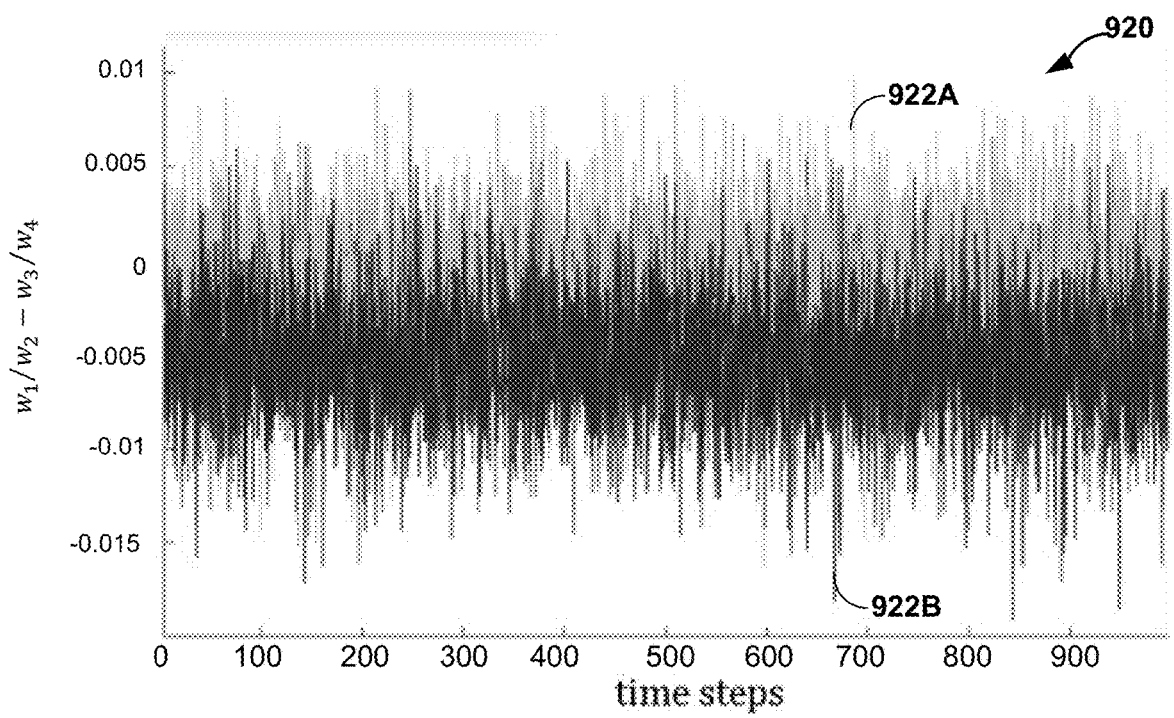

In the example of FIG. 9C, graph 920 shows two signals 922A and 922B, where the HMM classifies signal 922A as being no error state and signal 922B as an error state (which in this instance is a low tire pressure state). Each of signals 922A and 922B is defined as the difference between a ratio of the wheel speed sensor signal for the front left wheel ($w_1$) to the wheel speed sensor signal for the front right wheel ($w_2$) and the wheel speed sensor signal for the back left wheel ($w_3$) to the wheel speed sensor signal for the back right wheel ($w_4$). The clustering accuracy of the MEW is approximately 87% for classifying signals obtained when operating vehicle 101 in city traffic road and a country road.

Figure 9D:
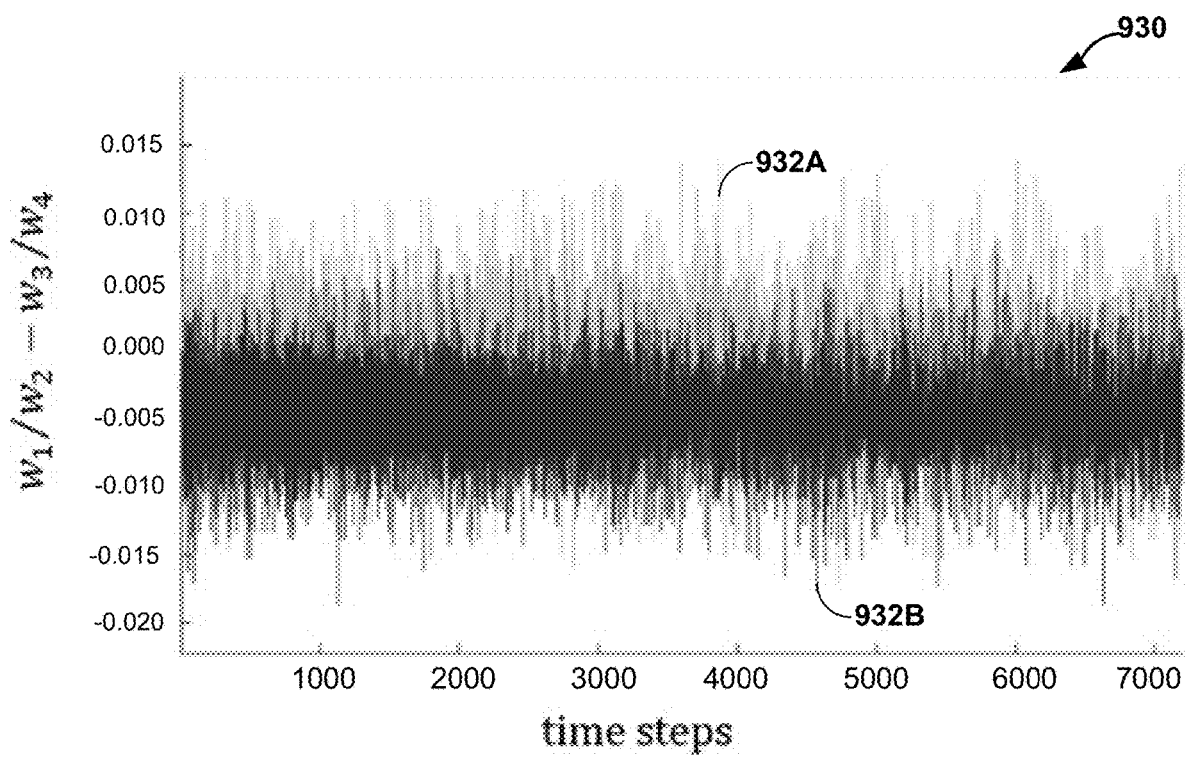

In the example of FIG. 9D, graph 930 shows two signals 932A and 932B, where the HMM classifies signal 932A as being a first error state (which in this instance is a noisy wheel hub) and signal 932B as an error state (which in this instance is a low tire pressure state). Each of signals 932A and 932B is defined as the difference between a ratio of the wheel speed sensor signal for the front left wheel ($w_1$) to the wheel speed sensor signal for the front right wheel ($w_2$) and the wheel speed sensor signal for the back left wheel ($w_3$) to the wheel speed sensor signal for the back right wheel ($w_4$). The clustering accuracy of the MEW is approximately 100% for classifying signals obtained when operating vehicle 101.

Graph 930 may illustrate one improvement of unsupervised learning models, such as HMM, where the HMM may identify new errors (a noisy wheel hub) potentially without being expressly exposed to the error state during training (where the HMM notes the difference with correctly operating components in contrast with incorrectly operating components). In operation, assuming that, using FFT-based spectral analysis of wheel speed, two error states (low tire pressure and noisy wheel hub) are reported and the corresponding time series are collected for advanced analytics in remote system 120. The clustering results (produced by remote system 120) may isolate different errors from each other in an unsupervised manner.

In this respect, various aspects of the techniques may enable automatic unsupervised learning for advanced analytics of collected time-series data (e.g., sensor signal data 250). Once sensor signal data 250 is obtained, machine-learning may be employed for automatic isolation/diagnosis of different fault/error states. As such, the unsupervised aspects of the techniques may provide one or more advantages, including 1) potentially eliminating labeling of data and the testing required to identify each label and apply the labels to the data; and 2) potentially providing a sequence labeling/tagging approach that may automatically group/distinguish different errors while also able to handle clustering of sequences with unequal length.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to perform diagnostics, the device comprising:
means for obtaining, from a plurality of sensors, a plurality of sensor signals representative of one or more states of a vehicle, wherein the plurality of sensors are not directly coupled to a wheel of the vehicle and none of the plurality of sensor signals defines a tire pressure of the wheel of the vehicle;
means for providing an indirect tire pressure monitoring system (iTPMS) to indirectly identify a low tire pressure state based on the plurality of sensor signals; and means for applying a trained classifier to the plurality of sensor signals to identify one or more components of the vehicle that result in a change of vibration during operation of the vehicle and whether a cause of the vibrations during the operation of the vehicle is the low tire pressure state of the wheel of the vehicle, wherein the trained classifier includes both a trained random forest classifier trained using supervised learning and a trained hidden Markov model trained using unsupervised learning.

2. A method of performing diagnostics, the method comprising:

obtaining, from a plurality of sensors, a plurality of sensor signals representative of one or more states of a vehicle, wherein the plurality of sensors are not directly coupled to a wheel of the vehicle and none of the plurality of sensor signals defines a tire pressure of the wheel of the vehicle;

providing an indirect tire pressure monitoring system (iTPMS) to indirectly identify a low tire pressure state based on the plurality of sensor signals; and applying a trained classifier to the plurality of sensor signals to identify one or more components of the vehicle that result in a change of vibration during operation of the vehicle and whether a cause of the vibrations during the operation of the vehicle is the low tire pressure state of the wheel of the vehicle, wherein the trained classifier includes both a trained random forest classifier trained using supervised learning and a trained hidden Markov model trained using unsupervised learning.

3. The method of claim 2, wherein applying the trained classifier comprises applying the trained classifier with respect to the plurality of sensor signals to also identify one or more components of a chassis of the vehicle that result in the change of the vibration during the operation of the vehicle.

4. The method of claim 3, wherein the components of the chassis of the vehicle includes one or more of a damper, a spring, a wheel hub, a brake, a control arm, a bushing, a tire rod, and a wheel bolt.

5. The method of claim 2, wherein the one or more sensors include a plurality of different types of sensors configured to at least some of sense wheel speed, relative wheel speed, yaw rate, pitch, lateral acceleration, lateral speed, roll, longitudinal acceleration, longitudinal speed, engine speed, or engine torque, and wherein the plurality of sensor signals include two or more sensor signals representative of two or more of wheel speed, relative wheel speed, yaw rate, pitch, lateral acceleration, lateral speed, roll, longitudinal acceleration, longitudinal speed, engine speed, and engine torque.

6. The method of claim 2, wherein applying the trained random forest classifier of the trained classifier comprises:

applying one or more decision trees to the plurality of sensor signals to obtain one or more results;

summing the one or more results; and identifying the one or more components of the vehicle that result in the change of the vibration during operation of the vehicle based on the summed results.

7. The method of claim 2, further comprising transforming, prior to applying the trained classifier, one or more of the plurality of sensor signals from a spatial domain to a frequency domain to obtain one or more frequency domain sensor signals, wherein applying the trained classifier comprises applying the trained classifier to the one or more frequency domain signals to identify the one or more components of the vehicle that result in the change of the vibration during the operation of the vehicle.

8. The method of claim 2, further comprising:

obtaining, based on the one or more components, a notification configured to inform an occupant of the vehicle of the one or more components of the vehicle that result in the change in the vibration during the operation of the vehicle; and interfacing with a display to present the notification.

9. A device configured to perform diagnostics, the device comprising:

a hardware interface configured to communicate with a plurality of sensors to obtain a plurality of sensor signals representative of one or more states of a vehicle, wherein the plurality of sensors are not directly coupled to a wheel of the vehicle and none of the plurality of sensor signals defines a tire pressure of the wheel of the vehicle; and one or more processors configured to:

provide an indirect tire pressure monitoring system (iTPMS) to indirectly identify a low tire pressure state based on the plurality of sensor signals; and apply a trained classifier with respect to the plurality of sensor signals to identify one or more components of the vehicle that result in a change of vibration during operation of the vehicle and whether a cause of the vibrations during the operation of the vehicle is the low tire pressure state of the wheel of the vehicle, wherein the trained classifier includes both a trained random forest classifier trained using supervised learning and a trained hidden Markov model trained using unsupervised learning.

10. The device of claim 9, wherein the one or more processors are configured to apply the trained classifier with respect to the plurality of sensor signals to also identify one or more components of a chassis of the vehicle that result in the change of the vibration during the operation of the vehicle.

11. The device of claim 9, wherein the one or more sensors include a plurality of different types of sensors configured to at least some of sense wheel speed, relative wheel speed, yaw rate, pitch, lateral acceleration, lateral speed, roll, longitudinal acceleration, longitudinal speed, engine speed, or engine torque, and wherein the plurality of sensor signals include two or more sensor signals representative of two or more of wheel speed, relative wheel speed, yaw rate, pitch, lateral acceleration, lateral speed, roll, longitudinal acceleration, longitudinal speed, engine speed, and engine torque.

12. The device of claim 9, wherein the one or more processors are further configured to transform, prior to applying the trained classifier, one or more of the plurality of sensor signals from a spatial domain to a frequency domain to obtain one or more frequency domain sensor signals, and wherein the one or more processors are configured to apply the trained classifier to the one or more frequency domain signals to identify the one or more components of the vehicle that result in the change of the vibration during the operation of the vehicle.

13. The device of claim 9, wherein the one or more processors are further configured to:

obtain, based on the one or more components, a notification configured to inform an occupant of the vehicle of the one or more components of the vehicle that result in the change in the vibration during the operation of the vehicle; and interface with a display to present the notification.

14. A non-transitory computer-readable medium having stored thereon instructions that, when executed, cause one or more processors of a diagnostic device to:

interface with a plurality of sensors to obtain a plurality of sensor signals representative of one or more states of a vehicle, wherein the plurality of sensors are not directly coupled to a wheel of the vehicle and none of the plurality of sensor signals defines a tire pressure of the wheel of the vehicle;

provide an indirect tire pressure monitoring system (iTPMS) to indirectly identify a low tire pressure state based on the plurality of sensor signals; and apply a trained classifier with respect to the plurality of sensor signals to identify one or more components that result in a change of vibration during operation of the vehicle and whether a cause of the vibrations during the operation of the vehicle is the low tire pressure state of the wheel of the vehicle, wherein the trained classifier includes both a trained random forest classifier trained using supervised learning and a trained hidden Markov model trained using unsupervised learning.

* * * * *